US012798554B2

(12) United States Patent
Berne et al.

(10) Patent No.: US 12,798,554 B2
(45) Date of Patent: Nov. 17, 2026

(54) COMPUTER SYSTEM AND COMPUTER-IMPLEMENTED METHOD

(71) Applicant: Volvo Truck Corporation, Gothenburg (SE)

(72) Inventors: Nicolas Berne, Heyrieux (FR); Mohammed Rachidi, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/933,299

(22) Filed: Oct. 31, 2024

(65) Prior Publication Data

US 2025/0178591 A1 Jun. 5, 2025

(30) Foreign Application Priority Data

Dec. 1, 2023 (EP) .................................... 23213687

(51) Int. Cl.

| | |
|---|---|
| ***B60W 30/04*** | (2006.01) |
| ***B60W 40/10*** | (2012.01) |
| ***B60W 50/14*** | (2020.01) |
| ***B66C 13/46*** | (2006.01) |
| ***B66C 23/78*** | (2006.01) |

(Continued)

(52) U.S. Cl.

CPC ............ *B60W 30/04* (2013.01); *B60W 40/10* (2013.01); *B60W 50/14* (2013.01); *B66C 13/46* (2013.01); *B66C 23/78* (2013.01); *B66F 17/00* (2013.01); *G06V 20/588* (2022.01); *B60W 2300/125* (2013.01); *B60W 2420/403* (2013.01); *B60W 2552/53* (2020.02); *G06V 2201/07* (2022.01)

(58) Field of Classification Search

CPC ......... B66C 13/46; B66C 23/78; B66C 23/80; B66C 23/88; B66C 23/90; B66C 23/905; B66F 17/00; B66F 17/006; B60W 30/004; B60W 40/10; B60W 50/14; B60W 2300/125; B60W 2420/403; B60W 2552/53; G60V 20/588; G60V 2201/07

See application file for complete search history.

(56) References Cited

U.S. PATENT DOCUMENTS 3,848,750 A * 11/1974 Hoge ...................... B66C 23/78 212/277

5,188,379 A * 2/1993 Krause ...................... B60S 9/12 254/423

(Continued)

FOREIGN PATENT DOCUMENTS

CN 109835293 A 6/2019

CN 115675667 A 2/2023

(Continued)

OTHER PUBLICATIONS

Extended European Search Report for European Patent Application No. 23213687.9, mailed May 24, 2024, 9 pages.

*Primary Examiner* — John M Zaleskas

(74) *Attorney, Agent, or Firm* — Withrow & Terranova, PLLC

(57) ABSTRACT

A computer system comprising processing circuitry configured to obtain, from a sensor system of a vehicle, target data; process the target data to identify an instability risk based on a relative movement between a member target and a surface target, and initiate an instability countermeasure based on the instability risk.

12 Claims, 15 Drawing Sheets

(51) Int. Cl.
*B66F 17/00* (2006.01)
*G06V 20/56* (2022.01)

(56) References Cited

U.S. PATENT DOCUMENTS

| | | | | | |
|---|---|---|---|---|---|
| 6,067,024 | A * | 5/2000 | Eckstine | G01S 13/93 212/277 |
| 6,351,696 | B1 * | 2/2002 | Krasny | B66C 23/80 701/50 |
| 10,124,773 | B1 * | 11/2018 | Mourlam | B60S 9/12 |
| 2007/0012641 | A1 * | 1/2007 | Hinata | B66C 23/905 212/277 |
| 2013/0277954 | A1 * | 10/2013 | Goeggelmann | B60S 9/04 280/763.1 |
| 2016/0340156 | A1 * | 11/2016 | Ost | B66C 23/78 |
| 2017/0217737 | A1 * | 8/2017 | Rudy | B66C 23/84 |
| 2018/0162410 | A1 | 6/2018 | Skillsater et al. | |
| 2020/0198943 | A1 * | 6/2020 | Königsson | B66C 23/905 |
| 2021/0009388 | A1 * | 1/2021 | Lutzeyer | B66F 17/006 |
| 2021/0347353 | A1 | 11/2021 | Park et al. | |
| 2022/0073323 | A1 * | 3/2022 | Mashima | B66C 23/78 |
| 2024/0368906 | A1 * | 11/2024 | Tang | E04G 21/0445 |
| 2024/0375891 | A1 * | 11/2024 | Müller | F04B 49/065 |

FOREIGN PATENT DOCUMENTS

| | | | | |
|---|---|---|---|---|
| DE | 10320382 | A1 * | 12/2004 | E02F 9/085 |
| JP | S626861 | A | 1/1987 | |
| KR | 100576793 | B1 | 8/2006 | |
| KR | 20180110822 | A * | 10/2018 | B66C 23/80 |
| KR | 20190032052 | A * | 3/2019 | B66C 23/78 |
| KR | 20200118633 | A * | 10/2020 | G01B 11/026 |

* cited by examiner

| | | C | | D | |
|---|---|---|---|---|---|
| | | increase | reduction | increase | reduction |
| A | increase | Yes | | | |
| | reduction | | | | |
| B | increase | | | | |
| | reduction | | | | Yes |

→ Pitch to the back

| | | C | | D | |
|---|---|---|---|---|---|
| | | increase | reduction | increase | reduction |
| A | increase | | Yes | | |
| | reduction | | | | |
| B | increase | | | | Yes |
| | reduction | | | | |

→ Roll out second side

| | | C | | D | |
|---|---|---|---|---|---|
| | | increase | reduction | increase | reduction |
| A | increase | | | | |
| | reduction | | Yes | | |
| B | increase | | | Yes | |
| | reduction | | | | |

→ Pitch to the front

| | | C | | D | |
|---|---|---|---|---|---|
| | | increase | reduction | increase | reduction |
| A | increase | | | | |
| | reduction | Yes | | | |
| B | increase | | | | |
| | reduction | | | Yes | |

→ Roll out first side

FIG. 2D

COMPUTER SYSTEM AND COMPUTER-IMPLEMENTED METHOD

PRIORITY APPLICATIONS

The present application claims priority to European Patent Application No. 23213687.9, filed on Dec. 1, 2023, and entitled "COMPUTER SYSTEM AND COMPUTER-IMPLEMENTED METHOD," which is incorporated herein by reference in its entirety.

TECHNICAL FIELD

The disclosure relates generally to a computer system and a computer-implemented method. In particular aspects, the disclosure relates to a computer system and a computer-implemented method for a vehicle with one or more stability members. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Within the field of heavy vehicles it is common to equip the vehicle with deployable stability members for engaging the ground while the heavy vehicle stands still. Such vehicles are often provided with a work attachment for performing various tasks, for example a crane or a ladder. Such work attachments impact the stability of the vehicle due to changing the center of gravity, particularly during operation of the work attachment.

The operation of the work attachment is thus associated with a risk, particularly if the ground is not very stable. An instable ground may cause the vehicle to slide or tilt uncontrollably.

SUMMARY

According to a first aspect of the disclosure, a computer system is provided. The computer system is configured to: obtain, from a sensor system of a vehicle, target data; process the target data to identify one or more member targets associated with one or more deployed stability member of the vehicle, the one or more deployed stability member of the vehicle being configured to engage a surface, and one or more surface targets associated with the surface; an instability risk based on a relative movement between the member target and the surface target, and; initiate an instability countermeasure based on the instability risk. The first aspect of the disclosure may seek to obtain a simple and non-complex manner of identifying and counteracting instability when the one or more stability members are deployed. A technical benefit may include that an existing sensor system of the vehicle may be utilized in order to improve the safety of the vehicle when the one or more stability members are deployed.

Optionally in some examples, including in at least one preferred example, the processing circuitry is further configured to identify the instability risk by determining that a relative movement between the member target and the surface target for the deployed stability member for a set time interval is outside a predefined threshold, and in response to the relative movement between said member target and the surface target being outside said predefined threshold, determine an instability countermeasure to be initiated. A technical benefit may include that a suitable instability countermeasure may be selected based on the detected relative movement, thereby improving the safety of the vehicle.

Optionally in some examples, including in at least one preferred example, the predefined threshold is associated with a maximum change in relative distance between the member target and the surface target for one deployed stability member. A technical benefit may include that a simple and non-complex manner of controlling the stability of the vehicle is achieved.

Optionally in some examples, including in at least one preferred example, the instability countermeasure comprises causing adjustment of the position of at least one of the one or more deployed stability members based on the target data. A technical benefit may include that the computer system may adjust and counteract the instability in a rapid and direct manner.

Optionally in some examples, including in at least one preferred example, the instability countermeasure comprises causing adjustment of the one or more deployed stability members to push at least one of the one or more deployed stability members towards the surface.

Optionally in some examples, including in at least one preferred example, the vehicle further comprises a work attachment operable upon deployment of the one or more deployed stability members. The determined instability countermeasure comprises at least one of rotating the work attachment, retracting the work attachment and stopping movement of the work attachment. A technical benefit may include that the work attachment may be utilized in order to stabilize the vehicle.

Optionally in some examples, including in at least one preferred example, the processing circuitry is configured to: determine a relative movement between a member target associated with a first deployed stability member and a surface target for the first deployed stability member for a set time interval, determine a relative movement between a member target associated with a second deployed stability member and a surface target for the second deployed stability member for a set time interval, and identify an instability countermeasure based on said determined relative movements.

A technical benefit may include that an instability countermeasure may be selected for addressing a detected instability between two deployed stability members.

Optionally in some examples, including in at least one preferred example, the processing circuitry is configured to determine a relative angular movement between the first and second deployed stability member based on: the determined relative movement between the member target associated with the first deployed stability member and the surface target for the first deployed stability member, and the determined relative movement between the member target associated with the second deployed stability member and the surface target for the second deployed stability member.

The processing circuitry may be further configured to identify the instability countermeasure based on the determined relative angular movement. A technical benefit may include that an instability risk may be identified with an improved precision.

Optionally in some examples, including in at least one preferred examples, the first deployed stability member is arranged at a first longitudinal side of the vehicle and the second deployed stability member is arranged at a second longitudinal side of the vehicle opposite to the first side. A technical benefit may include that a risk for a roll-out instability may be addressed.

Optionally in some examples, including in at least one preferred example, the first deployed stability member is arranged at a front portion the vehicle and the second deployed stability member is arranged at a rear portion of the vehicle opposite to the front portion. A technical benefit may include that a risk for a pitch instability may be mitigated.

Optionally in some examples, including in at least one preferred example, the member target and/or the surface target is provided as a graphical pattern identifiable by the sensor system and provided on the deployed stability member and the surface, respectively. A technical benefit may include that the operator of the vehicle is not required to position bulky physical objects in order for the processing circuitry being able to determine the relative movement.

Optionally in some examples, including in at least one preferred example, the surface target is provided at the surface and is associated with a reference position of engagement between the surface and the deployed stability member. The vehicle further comprises a work attachment operable upon deployment of the one or more deployed stability members. The processing circuitry is configured to: determine a relative movement between a member target associated with a first deployed stability member and a surface target for the first deployed stability member for a set time interval, determine a relative movement between a member target associated with a second deployed stability member and a surface target for the second deployed stability member for a set time interval, and identify an instability countermeasure based on said determined relative movements by selecting an instability countermeasure from a plurality of instability countermeasures. The instability countermeasures comprising any one of causing adjustment of the position of at least one of the one or more deployed stability members based on the target data, rotating the work attachment, retracting the work attachment, stopping movement of the work attachment and issuing an alert via a user interface of the vehicle. A technical benefit may include that a non-complex manner of mitigating the risk for dangerous instability is achieved.

According to a second aspect of the disclosure, a vehicle is provided. The vehicle comprises one or more deployed stability member, a sensor system and the computer system according to any of the examples described herein. A technical benefit may include that a more stable vehicle with a reduced risk for instability may be achieved.

Optionally in some examples, including in at least one preferred example, the sensor system comprises a camera monitoring system configured to monitor the member target and the surface target and capture image data comprising the target data. A technical benefit may include that an existing camera monitoring system such as a digital rearview/side view mirror-system may be utilized.

According to a third aspect of the disclosure, a computer-implemented method is provided. The computer-implemented method comprises: obtaining, by processing circuitry of a computer system, from a sensor system of a vehicle target data, processing the target data to identify: one or more member targets associated with one or more deployed stability member of the vehicle, the one or more deployed stability members being configured to engage a surface, and one or more surface targets associated with the surface, identifying an instability risk based on relative movement between the member target and the surface target, and initiating, by the processing circuitry, an instability countermeasure based on the instability risk. The second aspect of the disclosure may seek to obtain a simple and non-complex method of identifying and counteracting instability when the one or more stability members are deployed. A technical benefit may include that an existing sensor system of the vehicle may be utilized in order to improve the safety of the vehicle when the one or more stability members are deployed.

Optionally in some examples, including in at least one preferred example, the method may further comprise identifying the instability risk by determining, by the processing circuitry, that a relative movement between the member target and the surface target for the deployed stability member for a set time interval is outside a predefined threshold, and in response to the relative movement between said member target and the surface target being outside said predefined threshold, determining, by the processing circuitry, an instability countermeasure to be initiated. A technical benefit may include that a suitable instability countermeasure may be selected based on the detected relative movement, thereby improving the safety of the vehicle.

Optionally in some examples, including in at least one preferred examples, the method comprises: determining, by the processing circuitry, a relative movement between a member target associated with a first deployed stability member and a surface target for the first deployed stability member for a set time interval, determining, by the processing circuitry, a relative movement between a member target associated with a second deployed stability member and a surface target for the second deployed stability member for a set time interval, and identifying, by the processing circuitry, an instability countermeasure based on said determined relative movements. A technical benefit may include that an instability countermeasure may be selected for addressing a detected instability between two deployed stability members.

According to a fourth aspect of the disclosure, a computer program product for performing, when executed by the processing circuitry, the method of any of the examples described herein.

According to a fifth aspect of the disclosure, a non-transitory computer-readable storage medium is provided. The non-transitory computer-readable storage medium comprises instructions, which when executed by the processing circuitry, may cause the processing circuitry to perform the method of any of the examples described herein.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

FIG. 2D is an exemplary diagram of a control algorithm according to an example.

DETAILED DESCRIPTION

The detailed description set forth below provides information and examples of the disclosed technology with sufficient detail to enable those skilled in the art to practice the disclosure.

It is common that heavy vehicles are used to perform operations requiring the vehicle to stand still and remain stable while carrying a heavy and/or dynamic load. Such a load may for example stem from the operation of a work attachment such as a crane or ladder. In order to render the vehicle stationary and stable, actuatable stability members may be deployed to engage the ground. However, in cases where the ground is unstable, slippery or uneven, there may still be a risk for instability.

Figure 1:
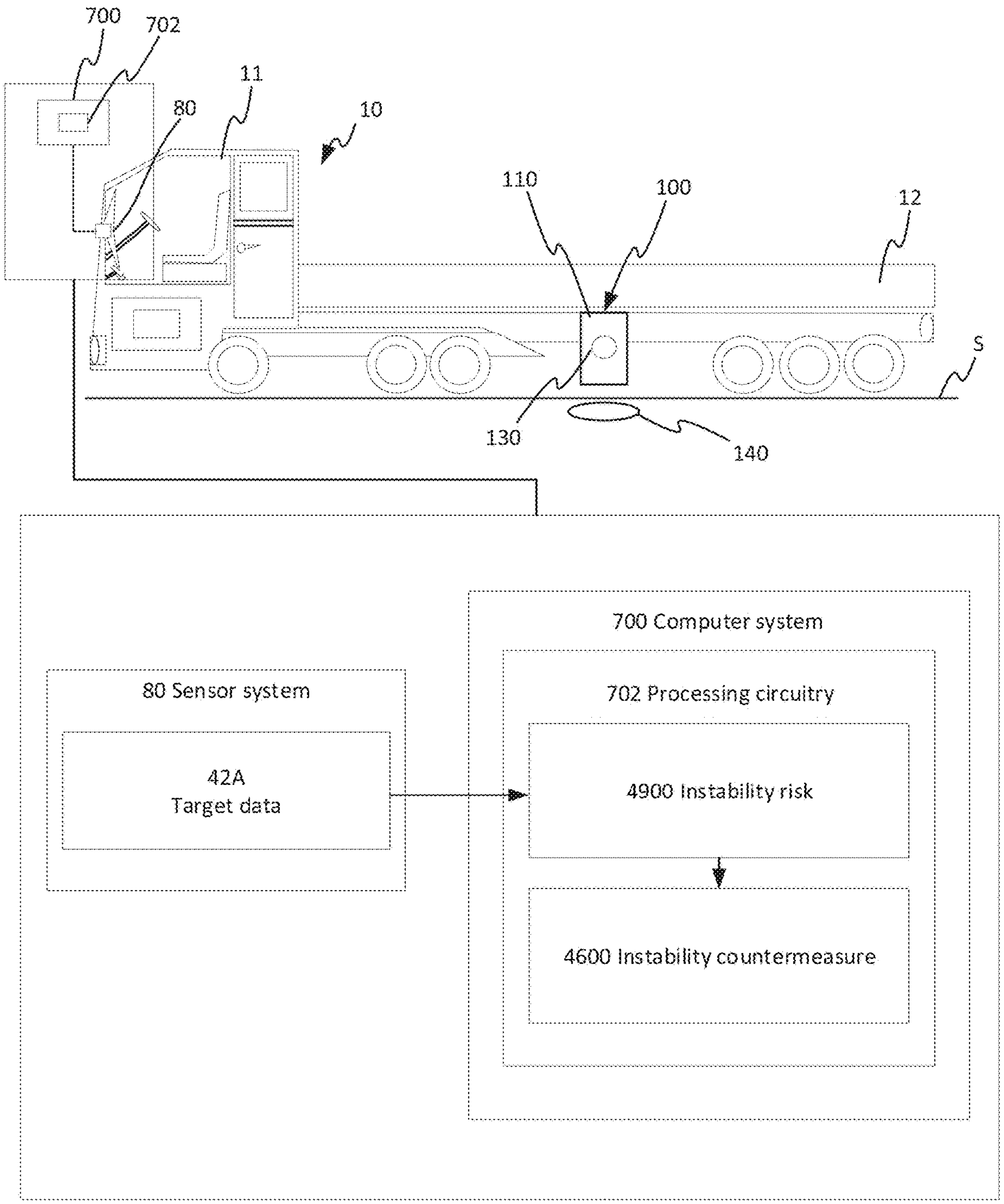
FIG. 1 is an exemplary vehicle and a system diagram of computer system according to an example.

FIG. 1 depicts aspects of a computer system and a vehicle which may address a risk for instability according to an example. The computer system 700 comprises processing circuitry 702. The processing circuitry 702 is configured to obtain target data 42A from a sensor system 80 of the vehicle 10. The processing circuitry 702 is configured to process the target data 42A to identify one or more member targets 130. The one or more member targets 130 is associated with one or more deployed stability members 110 of the vehicle 10.

The processing circuitry 702 is configured to process the target data 42A to identify one or more surface targets 140. The one or more surface targets 140 is associated with the surface S.

The processing circuitry 702 is configured to identify an instability risk 4900 based on relative movement between the member target 130 and the surface target 140 and initiate an instability countermeasure 4600 based on the instability risk 4900.

In one example, the processing circuitry 702 may be configured to identify the instability risk 4900 by determining the relative movement for a set time interval.

Figure 2A:
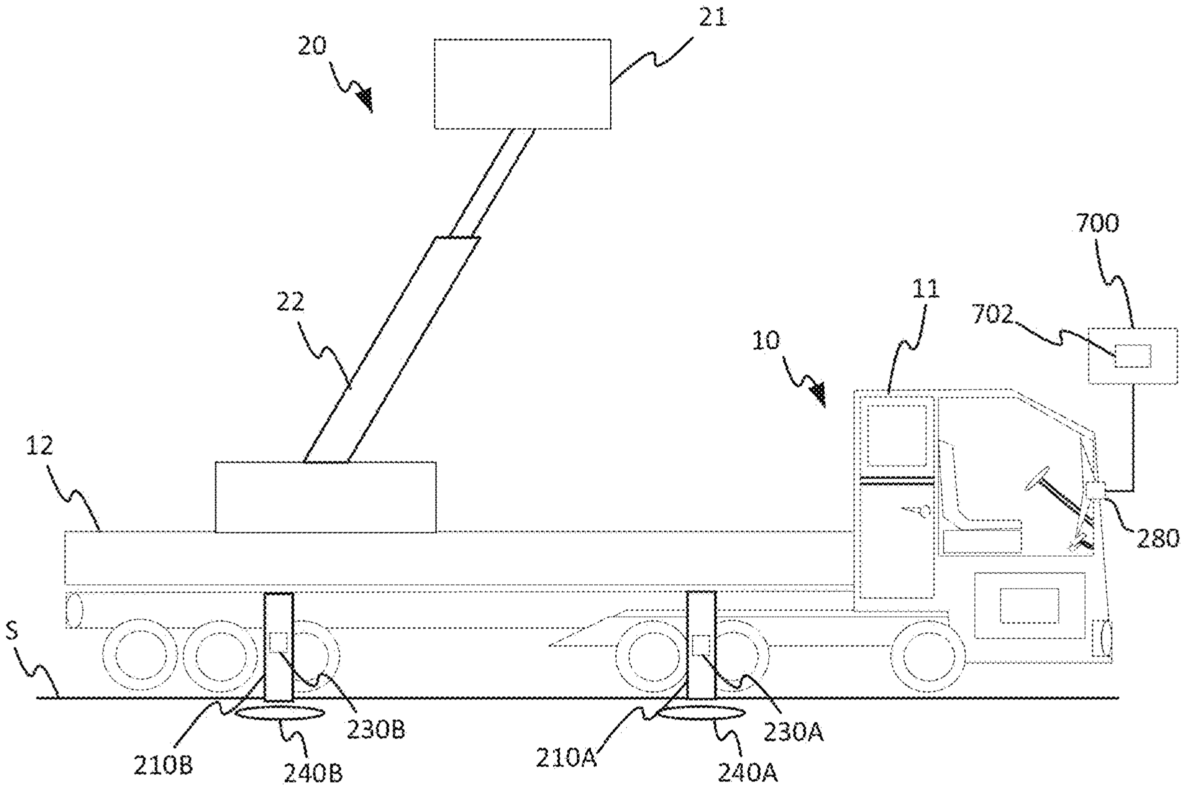
FIG. 2A is an exemplary vehicle according to an example depicted in a side view.
Figure 2B:
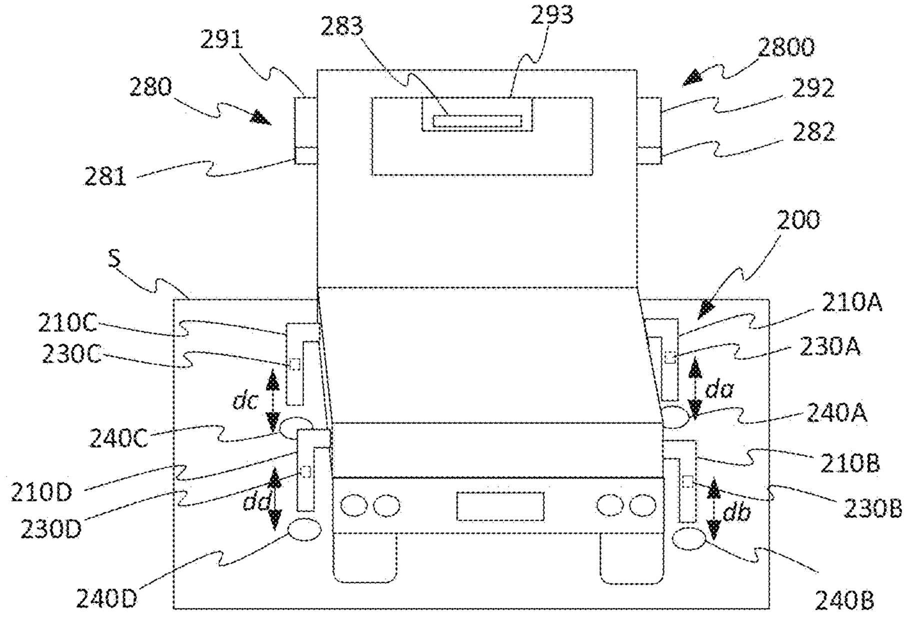
FIG. 2B is an exemplary vehicle according to an example depicted in a back view.

FIGS. 2A-2B depict a vehicle 10 and aspects of a computer system 700 according to an example. The vehicle 10 may comprise a work attachment 20. The work attachment 20 may be operable upon deployment of the one or more deployed stability members 210. The work attachment 20 may comprise a work attachment actuating mechanism 22 and a work attachment part 21. The work attachment actuating mechanism 22 may be operatively connected to the computer system 700 to enable control of the work attachment 20.

The work attachment actuating mechanism 22 may be hydraulic, pneumatic or electric. The work attachment actuating mechanism 22 may be configured to operate the work attachment part 21. The work attachment part 21 may for example a ladder or a crane basket. In the depicted example, the work attachment part 21 may be a crane basket. Accordingly, the depicted work attachment 20 may be a crane.

The stability member(s) 210 may be deployed or deployable stability member(s) 210. Upon deployment, the one or more stability members 110 may be configured to engage the surface S. The surface S may be an underlying surface onto which the vehicle 10 is positioned. The deployed stability member(s) 210 may be electrically, hydraulically or pneumatically operated. Accordingly, the deployed stability member(s) 210 may be operable by means of an electric, pneumatic actuator or hydraulic work attachment actuating mechanism 22. The vehicle 10 may comprise any suitable number of deployed stability member(s). It may be envisioned that the vehicle 10 may comprise a single or multiple deployed stability member(s). For example, the vehicle 10 may comprise at least two deployed stability members 210.

For each of the deployed stability members 210 a surface target 240 and a member target 230 is provided. In the depicted example, a first member target 230A is provided on the first deployed stability member 210A and a first surface target 240A associated with a point of engagement between the first deployed stability member 210A and the surface S is provided. Correspondingly, a second member target 230B is provided on the second deployed stability member 210B and a second surface target 240B associated with a point of engagement between the second deployed stability member 210B and the surface S is provided; a third member target 230C is provided on the third deployed stability member 210C and a third surface target 240C associated with a point of engagement between the third deployed stability member 210C and the surface S is provided; and a fourth member target 230D is provided on the fourth deployed stability member 210D and a fourth surface target 240D associated with a point of engagement between the fourth deployed stability member 210D and the surface S is provided. It may however be envisioned that for example one surface target may be utilized for multiple stability members such that the relative movement between a plurality of member targets relative a single surface target may be monitored.

The surface targets 240A-D and the member targets 230A-D may be in the form of any target suitable to be identified by the sensor system 280. The surface targets 240A-D and the member targets 230A-D may be provided as protruding structures protruding relative to the surroundings, light sources, reflections, projections and/or graphical patterns. The surface targets 240A-D may be fixed relative to the surface S, i.e. the surface targets 240A-D may be stationary relative to the surface S. The member targets 230A-D may be fixed relative to the deployed stability members 210A-D, i.e. the member targets 230A-D may be stationary relative to the deployed stability members 210A-D. Hence, if relative movement occurs between the surface S and the deployed stability members 210A-D, a corresponding relative movement between the member targets 230A-D and the surface targets 240A-D will be detected by means of the sensor system 280.

For example, surface targets 240A-D may be formed by objects being stationary relative to the surface S. In one example, the surface targets 240A-D may be provided as protruding structures stationary relative to the surface S such as traffic cones, traffic signs etc. In one example, the surface targets 240A-D may be provided as graphical patterns positioned on the surface S. The graphical patterns may be in the form of road markings on the surface or labelled objects positioned by an operator on the surface S. In one example, the surface targets 240A-D may be in the form of lighting identifiable by the sensor system 280. The lighting may be direct lighting such as a light source fixed relative to the surface S or a projection or reflection as a result of illumination by a light source.

Member targets 230A-D may be formed by objects being fixed relative to the deployed stability members 210A-D. In one example, the member targets 230A-D may be provided as protruding structures fixed relative to the deployed stability members 210A-D such as deployable markings or signs mounted to the deployed stability members 210A-D. In one example, the member targets 230A-D may be provided as graphical patterns positioned on the deployed stability members 210A-D. The graphical patterns may be in the form of markings on the outer surface of the deployed stability members 210A-D or labelled objects mounted onto the deployed stability members 210A-D. In one example, the member targets 230A-D may be in the form of lighting identifiable by the sensor system 280. The lighting may be direct lighting such as a light source fixed relative to the deployed stability members 210A-D or a projecting or reflecting element mounted to the deployed stability members 210A-D and illuminated by a light source.

In the depicted example, the vehicle 10 comprises four deployed stability members 210. A first deployed stability member 210A and a second deployed stability member 210B are arranged on opposite sides of a front portion of the vehicle 10. Correspondingly, a third deployed stability member 210C and a fourth deployed stability member 210D are arranged on opposite sides of a rear portion of the vehicle 10.

In the depicted example, each of the deployed stability members 210A-D is provided with a member target 230A-D. The member target 230A-D is provided in the form of a light source directly mounted to the deployed stability member 210A-D. The light source is directed such that the surface S is illuminated. Hence, the light source may be a downwardly directed light source. Each light source is configured to create a projection on the surface S. The projections on the surface S forms the surface targets 240A-D.

In the depicted example, the relative movement between the surface S and each deployed stability member 210A-D is monitored by means of monitoring of the relative distance between a light source mounted to each deployed stability member 210A-D and a projection formed by said light source onto the surface S for each deployed stability member 210A-D.

The processing circuitry 702 may thus be configured to identify the instability risk by determining a relative movement between the member targets 230 and the surface targets 240 for the deployed stability members 210.

In FIG. 2B, the distance between the member target and surface target is depicted as a distance d. The processing circuitry 702 may thus be configured to based on the obtained target data from the sensor system 80, determine a change in the distance d for the deployed stability members 210. In the depicted example, the processing circuitry 702 may be configured to: determine a change in the (first) distance da between the first member target 230A and the first surface target 240A; determine a change in the (second) distance db between the second member target 230B and the second surface target 240B; determine a change in the (third) distance dc between the third member target 230C and the third surface target 240C; and determine a change in the (fourth) distance dd between the fourth member target 230D and the fourth surface target 240D.

In FIG. 2B, the distance is depicted as a vertical distance. However, it may be envisioned that the surface target is not positioned directly underneath the deployed stability members 210, whereby the distance may extend in a diagonal direction.

In the depicted example, each projection forms a surface target 240A-D. The distances between the light sources and the projections thereby forms the distances da-dd. The sensor system 280 may thus be configured to monitor the position of the light sources and the projections forming the member targets 230A-D and the surface targets 240A-D, respectively.

The processing circuitry 702 may be configured to determine a relative movement between the member target 230A associated with a first deployed stability member 210A and a surface target 240A for the first deployed stability member 210A for a set time interval. The processing circuitry 702 may be configured to determine a relative movement between the member target 230A associated with a second stability member 210B and a surface target 240B for the second deployed stability member 210B for a set time interval. The processing circuitry 702 is configured to identify 46 an instability countermeasure 4600 based on the aforementioned determined relative movements.

The sensor system 280 may be operatively connected to the computer system 700. The sensor system 280 may be in the form of any type of conventional suitable sensor system for monitoring relative movement between two components. For example, the sensor system 280 may be in the form of any type of optically based sensor system. It may be envisioned that non-optical sensor systems may be utilized. In one example, the sensor system may be in the form of a radar or LIDAR system configured to identify targets in the form of radar or LIDAR identifiable objects. Accordingly, the surface targets and the member targets may be provided as radar or LIDAR identifiable objects.

The sensor system 280 may comprise a camera monitoring system 2800. The camera monitoring system 2800 may be configured to monitor the member target 130 and the surface target 140. The camera monitoring system 2800 may be configured to monitor the one or more member targets 230 and the one or more surface targets 240 and capture image data comprising the target data.

In the depicted example, the vehicle 10 may comprise a digital rearview mirror 293 and/or one or more digital side mirror 291, 292. The digital rearview mirror 293 and/or the one or more digital side mirror 291, 292 may be configured to obtain and display an image data feed from the camera monitoring system 2800. The cameras of the camera monitoring system 2800 may be positioned at any position suitable for monitoring the deployed stability members and the surface. Accordingly, the camera monitoring system 2800 may be configured to capture an image feed of the one or more deployed stability members and the one or more surface targets. In one example, a first camera 281 may be configured to monitor a zone including a first longitudinal side of the vehicle 10. A second camera 282 may be configured to monitor a zone including a second longitudinal side of the vehicle 10. In the depicted example, the first camera 281 is mounted to a first side mirror 291 and the second camera 282 is mounted to a second side mirror 292 of the vehicle 10. It may also be envisioned that a single camera may be utilized in order to monitor a zone including both said first and second longitudinal side of the vehicle 10. For example, a centrally arranged camera 283 may be configured to monitor a zone including the first and second longitudinal side of the vehicle 10. The centrally arranged camera 283 may be mounted to the cabin of the vehicle 10.

Figure 2C:
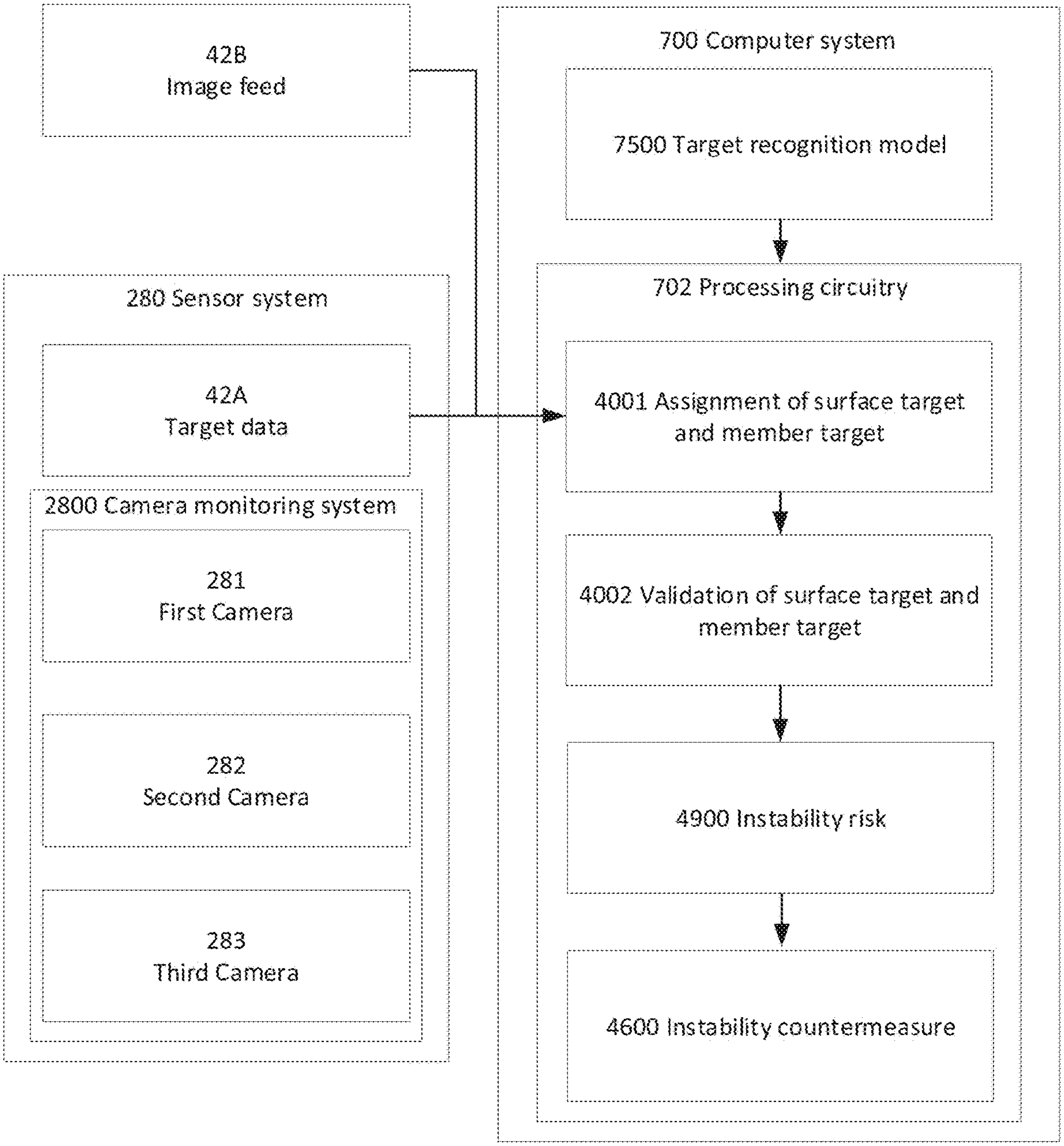
FIG. 2C is an exemplary view of a system diagram of a computer system and sensor system of the vehicle of FIGS. 2A-2B.

FIG. 2C depicts aspects of the computer system 700 and the sensor system 280. The computer system 700 and the sensor system 280 may be the computer system 700 and the sensor system 280 described with reference to FIGS. 2A-2B.

The sensor system 280 includes the camera monitoring system 2800 and one or more cameras. In the depicted example, the camera monitoring system 2800 comprises three cameras, e.g. the first camera 281, second camera 282 and the centrally arranged camera 283 herein denoted as a third camera 283.

The target data 42A may comprise the image feed 42B from the camera monitoring system 2800. The image feed 42B may be obtained from the camera(s) of the camera monitoring system 2800, for example, the first camera 281, the second camera 282 and the third camera 283.

Referencing FIG. 2C, the processing circuitry 702 may be configured to obtain an image feed 42B from the camera monitoring system 2800. The image feed 42B may be processed by a target recognition model 7500. It may be envisioned that the target recognition model 7500 may be a predefined target recognition model 7500 generated by processing circuitry included in the camera monitoring system 2800. Preferably and in the depicted example, the processing circuitry 702 of the computer system 700 may be configured to process the image feed 42B by means of a predefined target recognition model 7500. The target recognition model 7500 may comprise a set of algorithms for identifying the surface targets 240A-D and the member targets 230A-D in the image feed 42B obtained from the camera monitoring system 2800.

The predefined target recognition model 7500 may be a preset target recognition model 7500 configured to identify a preset type of surface targets 240A-D and/or member targets 230A-D. For example, the predefined target recognition model 7500 may be configured to identify a two-dimensional matrix bar code type utilized for the surface targets 240A-D and the member targets 230A-D. In one example, the processing circuitry 7500 may be configured to generate the predefined target recognition model 7500 by means of a calibration procedure in which the processing circuitry 702 operates in a calibration mode wherein identified objects in the image feed 42B are assigned 4001 as surface targets 240A-D and member targets 230A-D.

In one example, the processing circuitry 702 may be configured to validate 4002 the assigned surface targets 240A-D and the assigned member targets 230A-D. Upon validation 4002 the specificity of the assigned surface targets 240A-D and the assigned member targets 230A-D in the image feed 42B relative to the surroundings is determined. The validation may only be determined to be positive in response to a determined specificity for the assigned surface targets 240A-D and the assigned member targets 230A-D is within a predetermined threshold. The specificity may be determined based on an evaluation model of the contrast between the surroundings and the assigned surface targets 240A-D and the assigned member targets 230A-D, respectively in the image feed 42B. The validation 4002 may be particularly advantageous in cases where surface targets 240A-D and member targets 230A-D with a generally lower specificity are utilized.

FIG. 2D schematically depicts a control algorithm for determining the instability risk. The processing circuitry 702 may be configured to determine a relative angular movement between a first 210A-D and second deployed stability member 210A-D. The angular relative movement between the first 210A-D and second deployed stability member 210A-D is determined based on the determined relative movement between a member target 230A-D associated with the first deployed stability member 210A-D and the surface target 240A-D for the first deployed stability member 210A-D and the determined relative movement between the member target 230A-D associated with the second deployed stability member 210A-D and the surface target 240A-D for the second deployed stability member 210A-D. The processing circuitry 702 is further configured to identify the instability countermeasure based on the determined relative angular movement.

In the example depicted in FIG. 2C, the relative angular movement between the first, second, third and fourth deployed stability member 210A-D is determined based on the relative movement between the member target 230A-D and the surface target 240A-D for each of the stability deployed stability members 210A-D. A matrix for identifying the instability risk is depicted. A corresponds to the change in the distance da between the first member target 230A and the first surface target 240A; B corresponds to the change in distance db between the second member target 230B and the second surface target 240B; C corresponds to the change in distance dc between the third member target 230C and the third surface target 240C; and D corresponds to the change in distance dd between the fourth member target 230D and the fourth surface target 240D. An instability risk may be identified in case the changes in the aforementioned distances indicates any one of a pitch to the front of the vehicle, a pitch to the back of the vehicle, a roll out to a first side of the vehicle, a roll out to second side of the vehicle.

In the first matrix, the processing circuitry has determined that the distances da and dc has increased for a predefined time interval while the distances db and dd has decreased for the same predefined time interval. This indicates that the vehicle has started to pitch backwards. Accordingly, an instability risk may be identified.

In the second matrix, the processing circuitry has determined that the distances da and db has increased for a predefined time interval while the distances dc and dd has decreased for the same predefined time interval. This indicates that the vehicle has started to roll out to the second side, e.g. has begun to tilt about its longitudinal center axis towards the second side. Accordingly, an instability risk may be identified.

In the third matrix, the processing circuitry has determined that the distances db and dd has increased for a predefined time interval while the distances da and dc has decreased for the same predefined time interval. This indicates that the vehicle has started to pitch forwards. Accordingly, an instability risk may be identified.

In the fourth matrix, the processing circuitry has determined that the distances dc and dd has increased for a predefined time interval while the distances da and db has decreased for the same predefined time interval. This indicates that the vehicle has started to roll out to the first side, e.g. has begun to tilt about its longitudinal center axis towards the first side. Accordingly, an instability risk may be identified.

Figure 2E:
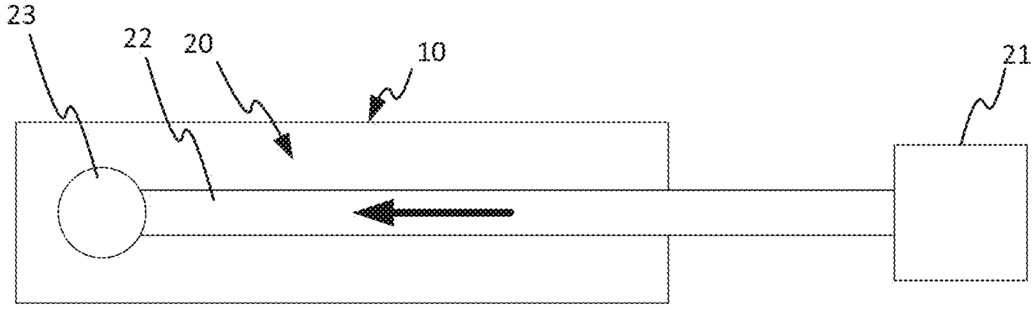
FIG. 2E is a schematic exemplary depiction of an instability countermeasure according to an example.
Figure 2F:
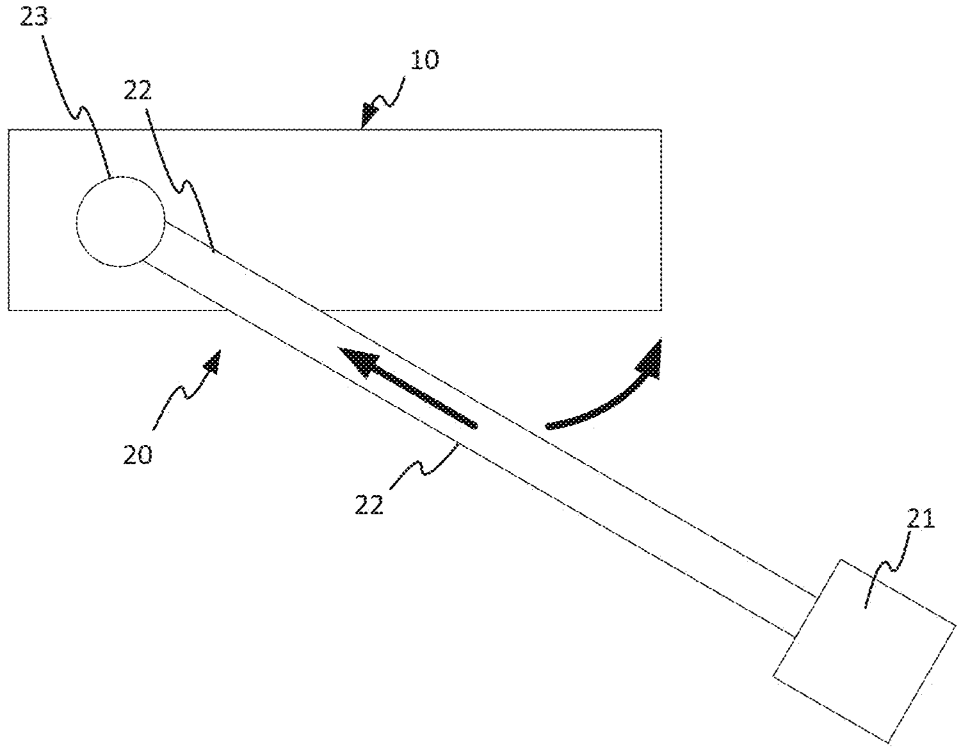
FIG. 2F is a schematic exemplary depiction of an instability countermeasure according to an example.

FIGS. 2E-2F depict examples of instability countermeasures to be performed based on the determined instability risk. The determined instability countermeasure may comprise at least one of rotating the work attachment 20, retracting the work attachment 20 and stopping movement of the work attachment 20.

In FIG. 2E, an instability risk in the form of a pitch to the back or to the front has been identified. In order to address the pitching, the work attachment 20 is retracted. The attachment part 21 is actuated by the work attachment actuating mechanism 22 to cause the work attachment part 21 to move to its non-extended position. Thereby, the center of gravity of the vehicle 10 is shifted and the pitching may be mitigated.

In FIG. 2F, an instability risk in the form of a roll out to the first or second side has been identified. In order to address the roll out, the work attachment 20 is rotated. The attachment part 21 may be rotated by means of a rotational work attachment drive member 23 configured to rotate the work attachment 20 relative a horizontal axis. By rotating the work attachment 20, the center of gravity is shifted and the roll out may be mitigated. Notably, this may be combined with retraction of the work attachment 20 in order to ensure that the instability risk has been addressed.

The computer system may be operatively connected to a work attachment control system configured to control the work attachment. The computer system may be configured to initiate the instability countermeasure by means of transmitting data to the work attachment control system to cause operation of the work attachment.

Figure 3A:
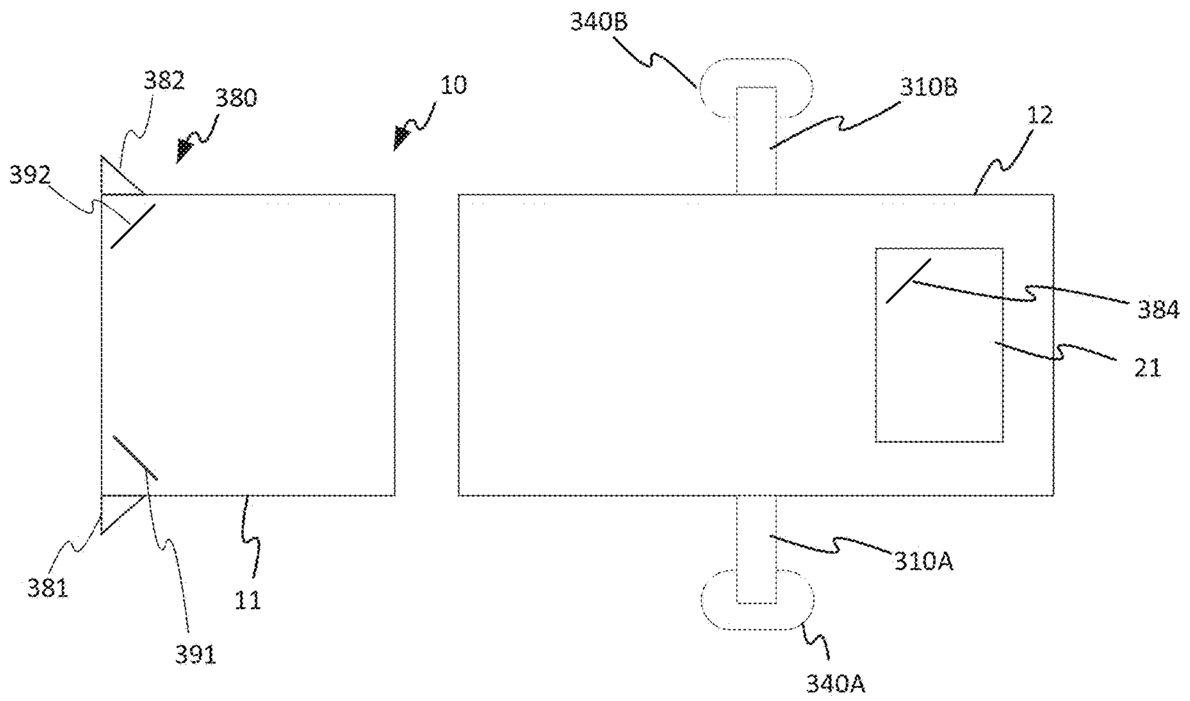
FIG. 3A is a top view of an exemplary vehicle according to an example.
Figure 3B:
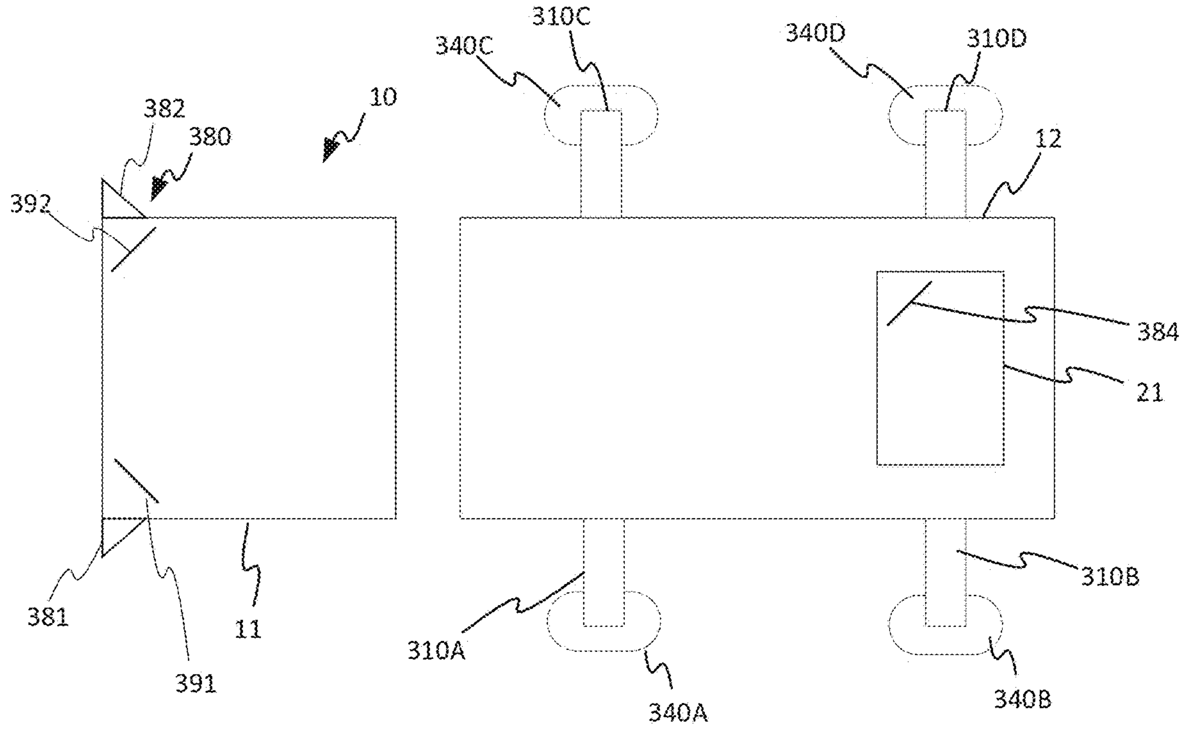
FIG. 3B is a top view of an exemplary vehicle according to another example.

FIGS. 3A-3B depict vehicles and aspects of a computer system according to another example. The vehicles 10 depicted in FIGS. 3A-3B comprise two and four deployed stability members. A first deployed stability member 310A may be arranged at the first longitudinal side of the vehicle 10. A second deployed stability member 310B may be arranged at the second longitudinal side of the vehicle 10 opposite to the first. Alternatively or additionally, a first deployed stability member 310A may be arranged at a front portion of the vehicle 10 and a second deployed stability member 310 may be arranged at a rear portion of the vehicle 10.

The vehicle 10 may comprise a user interface 384. The user interface 384 may be operatively connected to the computer system 700. In one example, an instability countermeasure may be to issue an alert via said user interface 384. In one example, the user interface 384 may be arranged in the work attachment part 21. Thereby, the alert may be provided to the user while the user is operating the work attachment 20. In the depicted example, the user interface 384 may be provided as a display unit arranged in the work attachment part 21.

It may however also be envisioned that the user interface 384 may comprise the digital side mirrors 381, 381 and/or the digital rearview mirrors 391, 392, whereby an instability countermeasure may comprise issuing an alert via the displays of said digital side mirrors 381, 381 and/or digital rearview mirrors 391, 392.

Figure 4A:
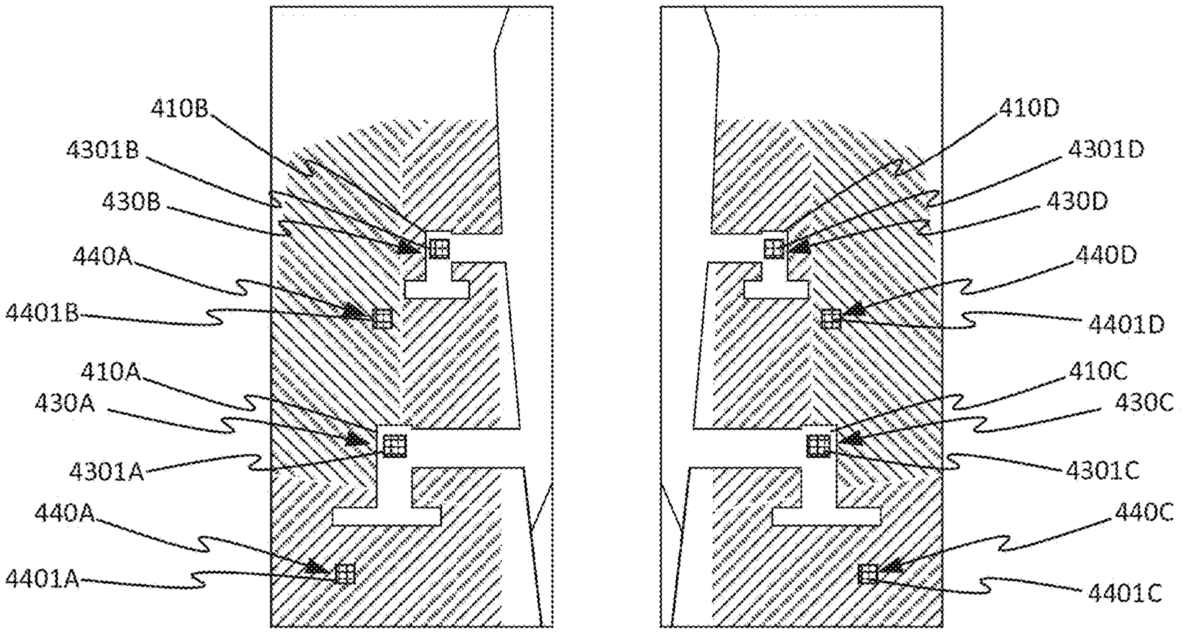
FIG. 4A is a view of the longitudinal sides of a vehicle according to an example.

FIGS. 4A-4E depicts a backward view from the front of the vehicle. FIGS. 4A-4E, depicts alternative examples of surface targets and member targets which may be utilized to identify the instability risk. In FIG. 4A, the member targets 430A-D are provided as graphical patterns 4301A-D. Similarly, the surface targets 440A-D are provided as graphical patterns 4401A-D. The graphical pattern may be identifiable by the sensor system and may be provided on the deployed stability members 410A-D and the surface S, respectively. The graphical patterns may provided as a labelled elements positioned on the surface S or attached to the deployed stability members 410A-D. It may however also be envisioned that the graphical patterns are etched onto the deployed stability members 410A-D. Numerous graphical patterns are available for such a purpose. Advantageously, the graphical pattern may be in the form of bar code. The bar code may be a two-dimensional matrix bar code such as for example a QR-code, associated with an identifier which in turn may be associated with the deployed stability member and point of engagement between the surface and the deployed stability member. In one example, the two-dimensional matrix bar code may be in the form of an augogram. As the skilled person is aware, an augogram is a computer generated image configured to provide coordinates and/or interest points in an image feed.

Figure 4B:
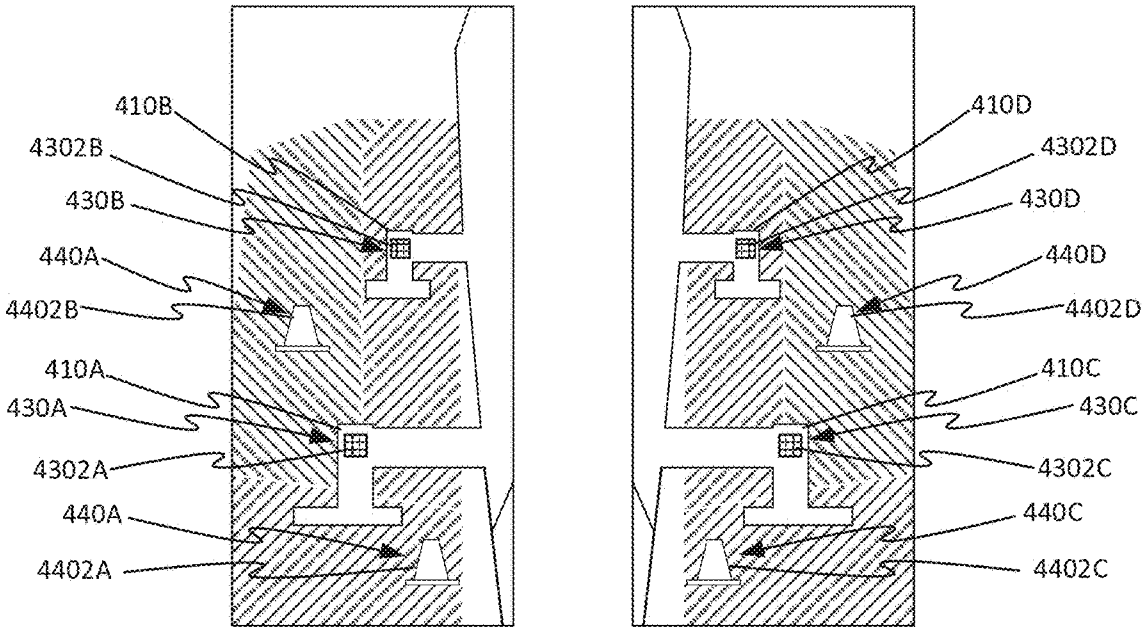
FIG. 4B depicts the same view as FIG. 4B with surface targets and member targets according to another example.

In FIG. 4B, the member targets 430A-D are provided as graphical patterns 4302A-D while the surface targets 440A-D are provided as physical deployable objects 4402A-D. In the depicted example, the surface targets 440A-D are provided as traffic cones. A physical deployable object may be provided in the proximity of each deployed stability member 410A-D.

Figure 4C:
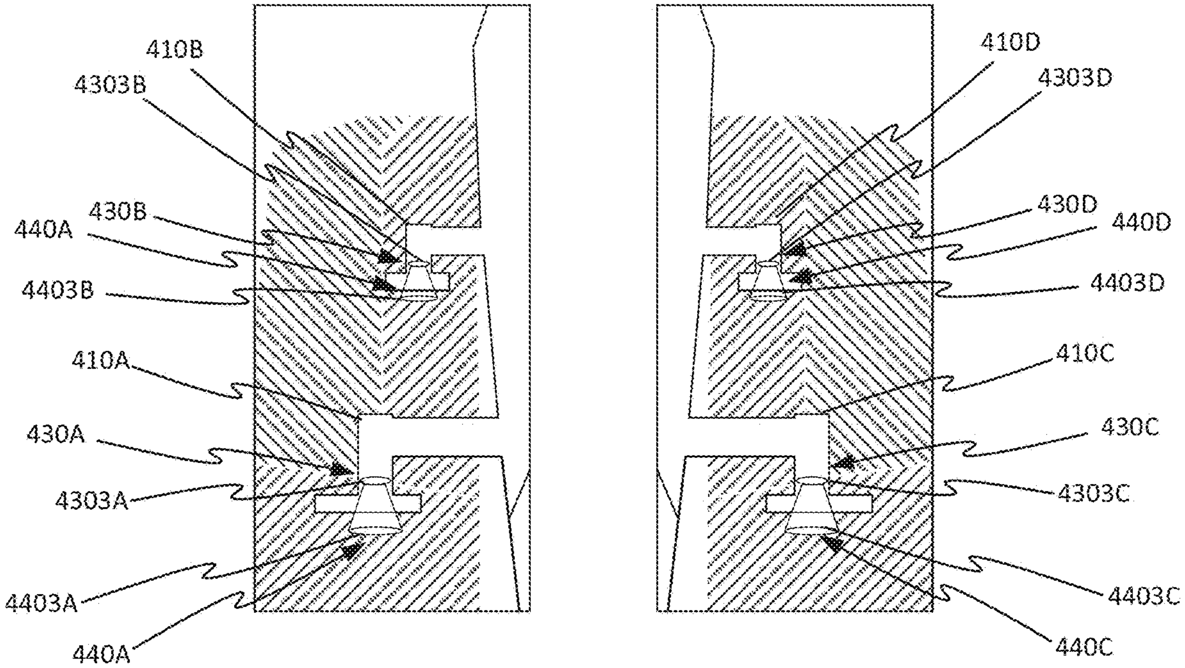
FIG. 4C depicts the same view as FIGS. 4A-4B with surface targets and member targets according to another example.

In one example, the physical deployable objects may be provided with graphical patterns to differentiate between each surface target 440A-D. In the depicted example, the physical deployable objects are not provided with any graphical pattern. According to such an example, each physical deployable object may be assigned as a surface target 440A-D upon the processing circuitry 702 operating in the calibration mode. In one example, the each physical deployable object may be assigned as a surface target 440A-D and be assigned to a corresponding member target 430A-D. In FIG. 4C, the member target 430A-D are provided as light sources 4303A-D while the surface targets 430A-D are provided as light projections or reflections 4403A-D. The light sources 430A-D may be mounted to the deployed stability members 410A-D. The light sources may be identifiable by the sensor system. The projections formed by the light-sources 4303A-D on the surface S may form the light projections or reflections 4403A-D. Utilizing light sources, reflections and projections may be particularly advantageous as it does not require the operator to manually position member targets or surface targets. Furthermore, light sources, reflections and projections may be identifiable by the sensor system even in the dark, allowing for a more versatile manner of monitoring the deployed stability members.

The light sources 4303A-D may be directed such that the surface S is illuminated. Accordingly, the light sources 4303A-D may be arranged to be angled at least partially downwards towards the surface S.

In one example, the member target 430A-D and/or the surface target 440A-D may be provided as reflectors. The reflectors may be configured to be illuminated by a light source and thereby be identifiable by the sensor system of the vehicle. Advantageously, the member target 430A-D is provided as a light source or reflector while the surface target 440A-D is provided as a projection. This allows for the vehicle to be provided with a built-in light source which makes the process of setting up the targets less complex and faster. In one example, the vehicle may be provided with the light source configured to illuminate the reflectors.

Figure 4D:
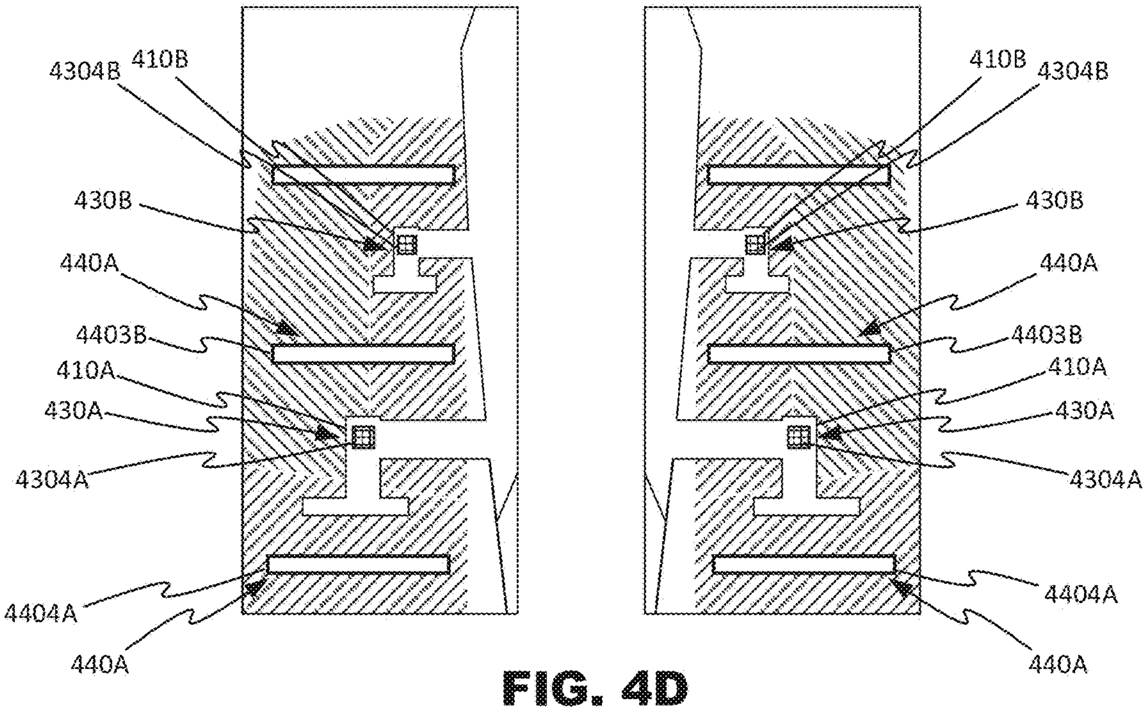
FIG. 4D depicts the same view as FIGS. 4A-4C with surface targets and member targets according to another example.

In FIG. 4D, the member targets 430A-D are provided as graphical patterns 4302A-D while the surface targets 440A-D are provided as physical stationary objects 4404A-D. In the depicted example, the surface targets 440A-D are provided as road markings on the surface S. Notably, the road markings may be pre-existing markings and a single road marking may be utilized as a surface target for a plurality of deployed stability members 410A-D.

Figure 4E:
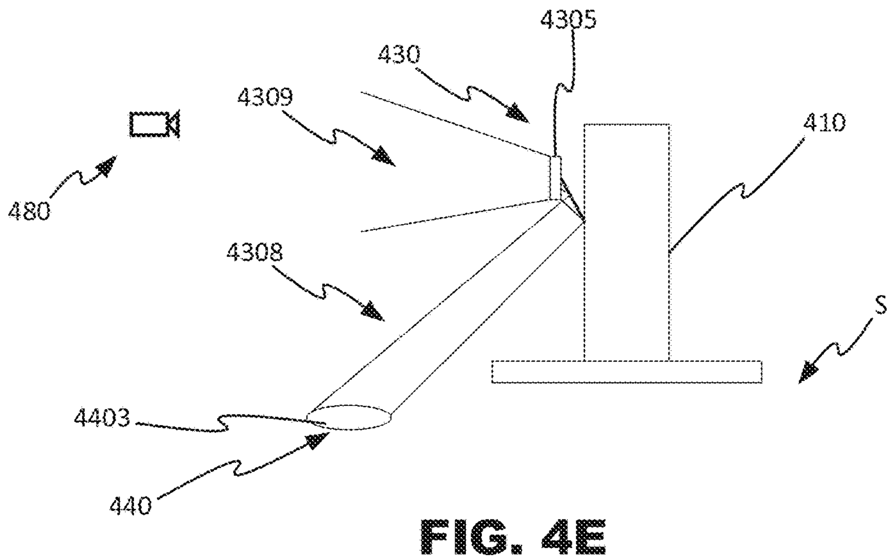
FIG. 4E depicts a deployed stability member, surface target and member targets according to one example.

FIG. 4E aspects of a system according to an example. The deployed stability member 410 is provided with a member target 430. Further, a surface target 440 is provided on the surface S. The deployed stability member 410 is provided with a light source 4305. The light source 4305 is configured to emit a first light 4308 onto the ground such that a projection 4305 in the form of a first light pattern is formed on the ground. The projection thereby constitutes the surface target 440. The light source 4305 may be further configured to emit a second light 4309. The light source 4305 may be configured to emit the second light 4309 in a direction extending at least partially parallel with the surface S and preferably in a direction towards the sensor system 480, i.e. a sensor of the sensor system 480. The second light 4309 thus forms a direct light identifiable by the sensor system 480, The second light 4309 may form a light pattern identifiable by the sensor system 480. The light source 4305 may be arranged in a light module. The light module may be configured to provide direct or indirect lighting. The light module may be mounted to the deployed stability member 410.

To improve accuracy, the first light 4308 and the second light 4309 may each form a light pattern identifiable by the sensor system 480. In the depicted example, the light source 4305 emits circular first and second lights thereby forming a circular light patterns. It may however be envisioned that other light patterns are emitted such as crosses, lines, graphic symbols etc. Compared to projections and lighting stemming from a unidirectional light source, light forming a light pattern allows for an improved accuracy due to the clearly defined light patterns being more easily distinguishable by the sensor system 480.

Figure 5A:
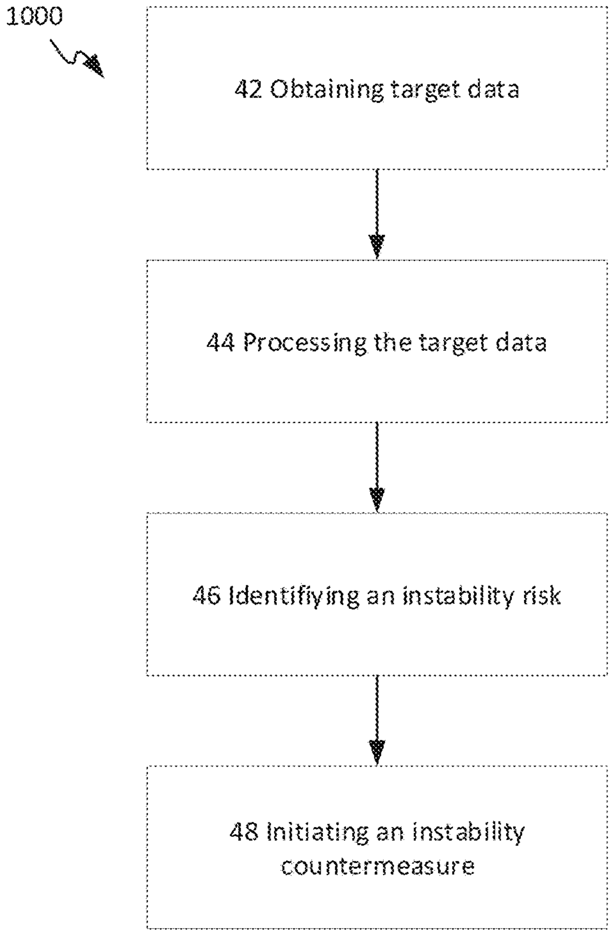
FIG. 5A is an exemplary flow chart of a method according to an example.

FIG. 5A depicts a computer-implemented method according to an example. The method 1000 comprises obtaining 42, by the processing circuitry 702 of the computer system 700 (depicted in FIG. 1), target data 42A from the sensor system of the vehicle. The method 1000 comprises processing 44, the target data 42A to identify the one or more member targets 130, 230, 430 associated with the one or more deployed stability members 110, 210, 310, 410 of the vehicle 10 and one or more surface targets associated with the surface S. The method 1000 comprises identifying 46 an instability risk 4900 based on relative movement between the member target 130, 230, 430 and the surface target 140, 240, 340, 440 and initiating 48, by the processing circuitry 702, an instability countermeasure 4600 based on the instability risk.

Figure 5B:
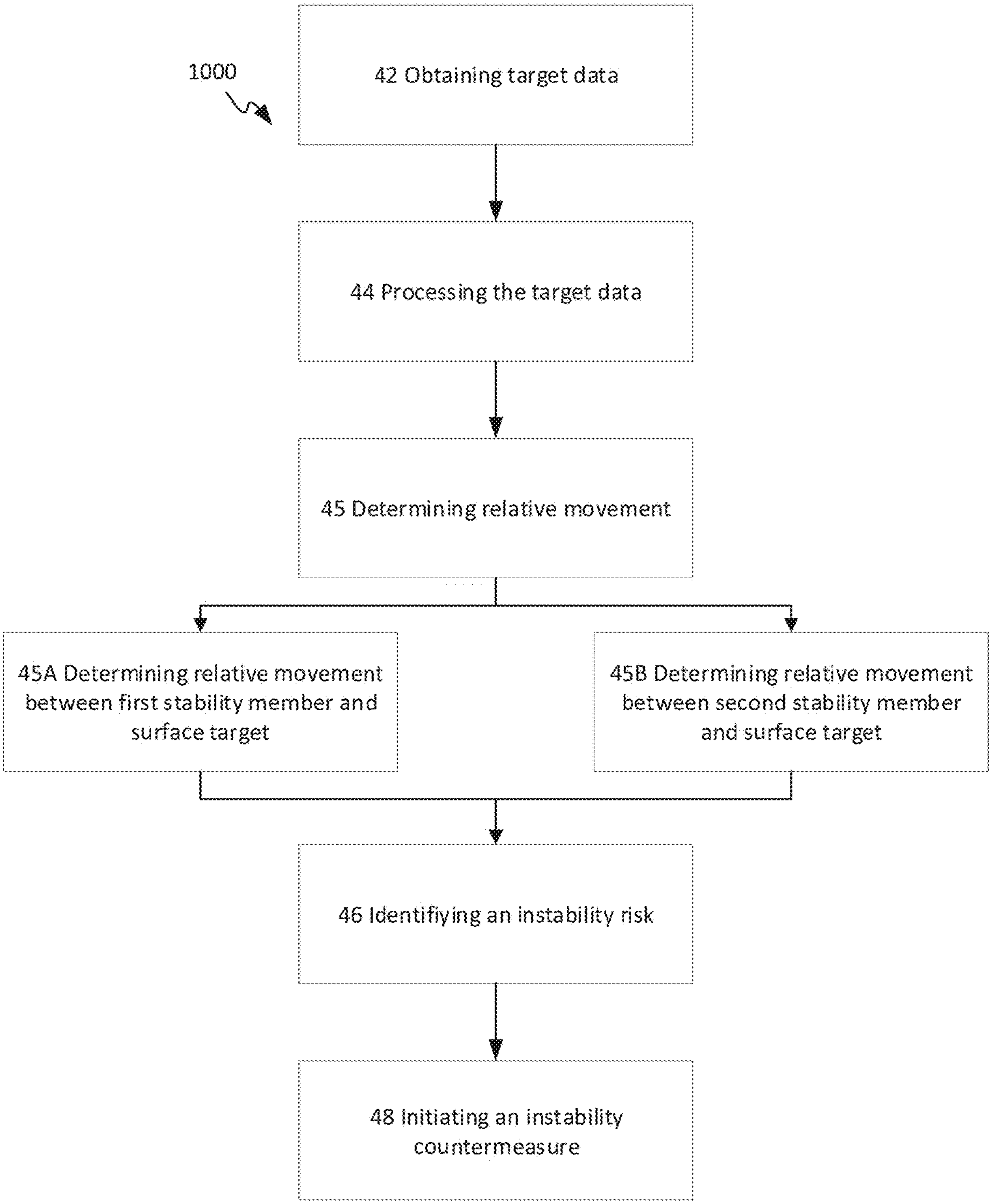
FIG. 5B is an exemplary flow chart of a method according to an example.

FIG. 5B depicts a system diagram of an exemplary computer-implemented method. The method 1000 may comprise identifying the instability risk 4900, by determining 45, by the processing circuitry 702, that a relative movement between the member target 130, 230, 430 and the surface target 140, 240, 340, 440 for the deployed stability member 110, 210, 310, 410 for a set time interval is outside a predefined threshold. The method 1000 may further comprise to in response to the relative movement between the member target 130, 230, 430 and the surface target 140, 240, 340, 440 being outside said predefined threshold, determining, by the processing circuitry 702, an instability countermeasure 4600 to be initiated 46. In one example, the method 1000 may comprise determining 45A, by the processing circuitry 702, a relative movement between a member target 130, 230, 430 associated with a first deployed stability member 110, 210, 310, 410 and a surface target 240, 340, 440 for the first deployed stability member 110, 210, 310, 410 for a set time interval. The method 1000 may further comprise determining 45B, by the processing circuitry 702, a relative movement between a member target 130, 230, 430 associated with a second deployed stability member 110, 210, 310, 410 and a surface target 240, 340, 440 for the second deployed stability member 110, 210, 310, 410 for a set time interval. The method 1000 may comprise identifying 46, by the processing circuitry 702, an instability countermeasure 4600 based on said determined relative movements.

The processing circuitry 702 may be configured to obtain 42 the target data 42A from the sensor system 80, 280, 380, 480 and process 44 the target data 42A to identify the one or more member targets 130, 230, 430 and the one or more surface targets 140, 240, 340, 440. The processing circuitry 702 may be further configured to identify 46 the instability risk and initiate 48 the instability countermeasure 4600 based on the instability risk. The processing circuitry 702 may be configured to perform the aforementioned methods.

Figure 6:
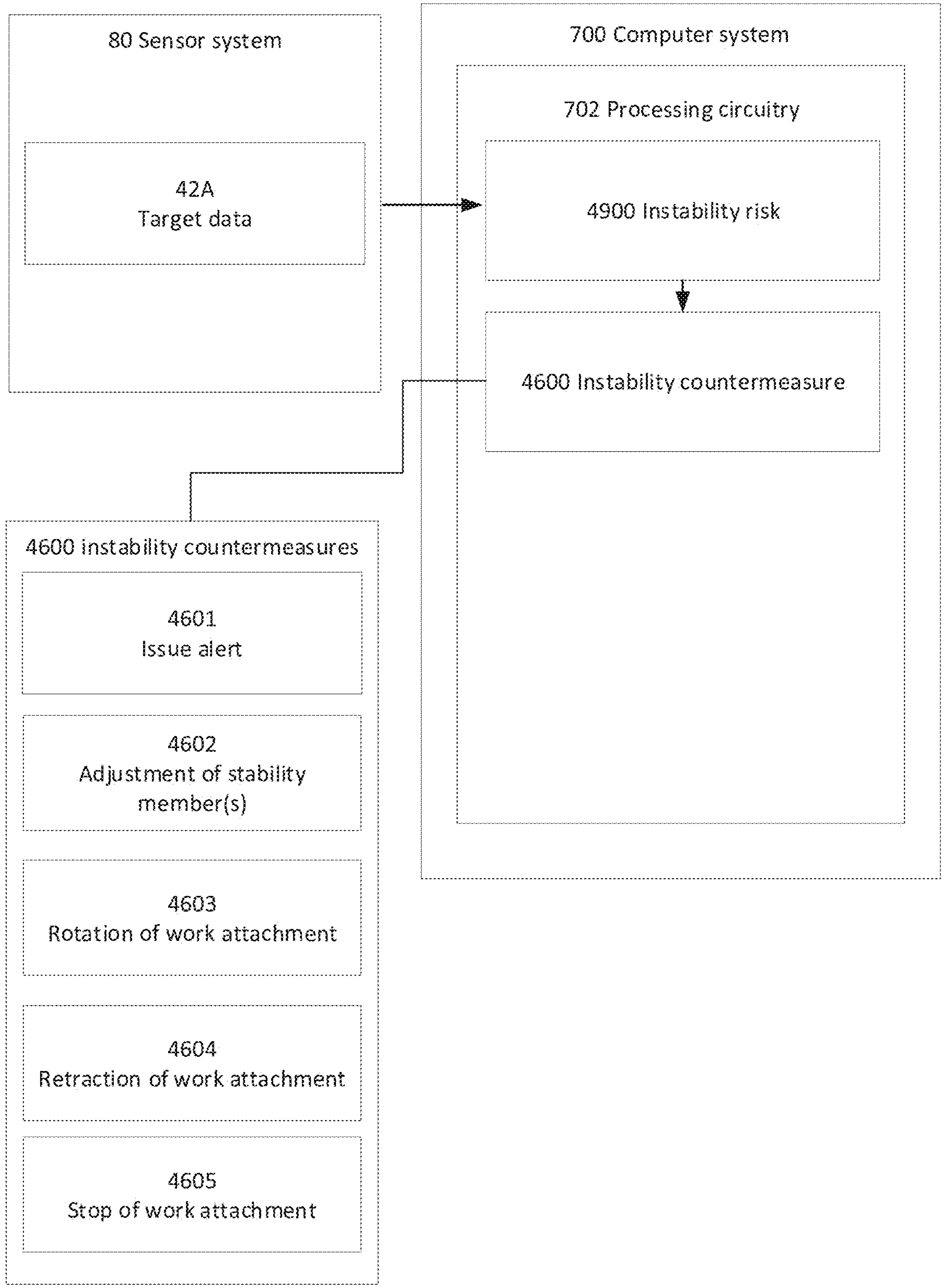
FIG. 6 is an exemplary flow chart of a system according to an example.

FIG. 6 depicts aspects of the present disclosure according to an example. The processing circuitry 702 may be configured to determine an instability countermeasure 4600 based on the determined instability risk 4900. As aforementioned, the instability countermeasure 4600 may comprise any one of rotating 4603 the work attachment, retracting 4604 the work attachment and stopping 4605 the work attachment. In one example, the instability countermeasure 4600 may comprise issuing 4601 an alert via a user interface of the vehicle. The processing circuitry 702 may thus be configured to issue said alert via the user interface. The user interface may be any type of user interface suitable, such as a visual or tactile user interface.

In one example, the instability countermeasure 4600 may comprise causing adjustment 4602 of the one or more deployed stability members of the vehicle. The adjustment may be based on the target data 42A. The processing circuitry 702 may thus be configured to cause adjustment of the one or more deployed stability members based on the target data 42A. In one example, said instability countermeasure 4600 may comprise causing adjustment of the one or more deployed stability members to push at least one of the one or more deployed stability members towards the surface.

The instability countermeasure of causing adjustment 4602 of the one or more deployed stability member may be particularly in cases of acute instability. Hence, said instability countermeasure may be suited to address fast variations in the relative distance between the member target and the surface target for the one or more deployed stability member. Accordingly, the processing circuitry 702 may be configured to determine the instability countermeasure of causing adjustment 4602 in response to the relative movement of the member target and surface target of the one or more deployed stability members exceeding a predefined maximum distance for a predefined time interval.

The processing circuitry 702 may be configured to, based on the determined instability risk 4900, select an instability countermeasure 4600 from a plurality of instability countermeasures. The plurality of instability countermeasure may be considered a plurality of predefined instability countermeasures. Based on the determined instability risk 4900, one or more instability countermeasures may be selected and the vehicle may be operated accordingly.

The instability countermeasure may be selected based on the severity of the determined instability risk. The severity may be associated with how fast the relative distance between member target and surface target changes. Advantageously, the instability countermeasure of adjusting the deployed stability members may be selected in response to a determined risk of sever instability while the instability countermeasure of issuing an alert may be selected in response to a determined risk of less sever instability. The rotating, stopping and/or retracting of the work attachment may be selected as the instability countermeasure for cases of a determined risk of intermediate severity of instability.

The severity of the instability may be associated with a change in relative distance between the member target and surface target for a set time interval. As aforementioned the countermeasure of instability countermeasure may be selected in response to the relative movement between the member target and the surface target exceeding a predefined maximum distance for a predetermined time interval. The instability countermeasure of issuing an alert may correspondingly be selected in response to the relative movement between the member target and the surface target exceeding a predefined maximum distance for a predetermined time interval. The time interval may be longer than the predetermined time interval associated with the selection of the instability countermeasure of adjusting the deployed stability member(s). Additionally or alternatively, the predefined maximum distance may be shorter than the predefined maximum distance associated with the selection of the instability countermeasure of adjusting the deployed stability member(s). Hence, the instability countermeasure may selected based on the severity of the determined instability risk.

The instability countermeasure of retracting, stopping and/or rotating the work attachment may be selected in cases of an intermediate instability. Accordingly, said instability countermeasure(s) may be selected in response to the relative movement between the member target and the surface target exceeding a predefined maximum distance for a predetermined time interval. The time interval may be longer than the time predetermined time interval associated with the selection of the instability countermeasure of adjusting the deployed stability member(s) and shorter than the time interval associated with the instability countermeasure of issuing an alert. Additionally or alternatively, the predefined maximum distance may be shorter than the predefined maximum distance associated with the selection of the instability countermeasure of adjusting the deployed stability member(s) and longer than the predefined maximum distance associated with the selection of the instability countermeasure of issuing an alert.

Figure 7:
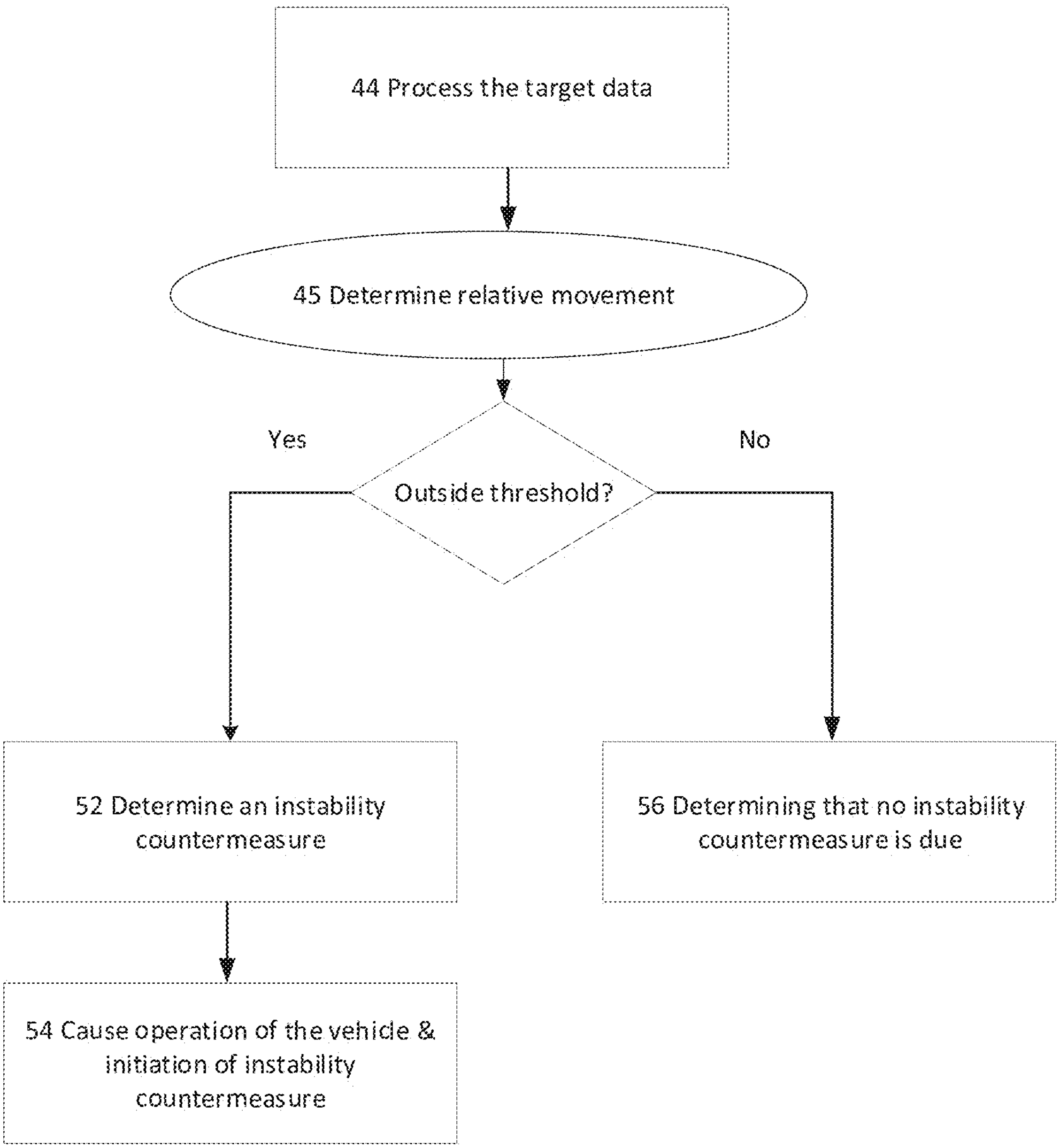
FIG. 7 is an exemplary flow chart of a control algorithm according to an example.

FIG. 7 depicts aspects of the present disclosure according to an example. The processing circuitry 702 may be configured to identify 46 the instability risk 4900 by determining 45 a relative movement between the member target and the surface target for a deployed stability member and by determining that said relative movement for a set time interval is outside a predefined threshold.

In response to the relative movement being outside of said predefined threshold, an instability countermeasure to be initiated may be determined 52. Accordingly, if the relative movement is determined to be outside the predefined threshold, an instability risk is determined and a suitable instability countermeasure is subsequently determined. Upon determination of the instability countermeasure, the processing circuitry 702 may be configured to cause operation of the vehicle and initiation of the instability countermeasure. The predefined threshold may be associated with a maximum change in relative distance between the member target and the surface target for one deployed stability member. In an example wherein the vehicle comprises a plurality of deployed stability members, the relative distance for each deployed stability member may be determined. Further, each deployed stability member may be associated with a predefined threshold. Preferably, the threshold is the same for each deployed stability member. However, this is not required.

In one example, the processing circuitry 702 may be configured to operate in a calibration mode. In the calibration mode, an initial relative distance between the member target and the surface target for each of the deployed stability members is determined. The predefined threshold may be determined based on said initial relative distance. Preferably, the predefined threshold may be determined such that only a limited increase and decrease of the relative distance is allowed before it is determined that there is an instability risk.

Figure 8:
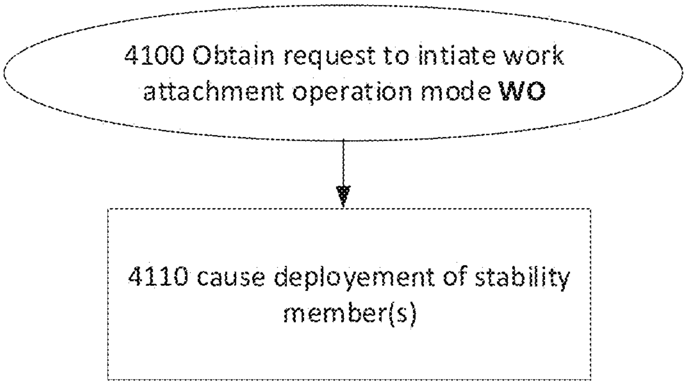
FIG. 8 is an exemplary flow chart of a method according to an example.

FIG. 8 depicts aspects of the present disclosure according to an example. The processing circuitry 702 may be configured to obtain 4100 a request to initiate a work attachment operation mode WO. In the work attachment operation mode WO, the work attachment 20 is operable.

In response to the obtaining the request to initiate the work attachment operation mode WO, the processing circuitry 702 may be configured to cause deployment 4110 of the one or more stability member.

Figure 9:
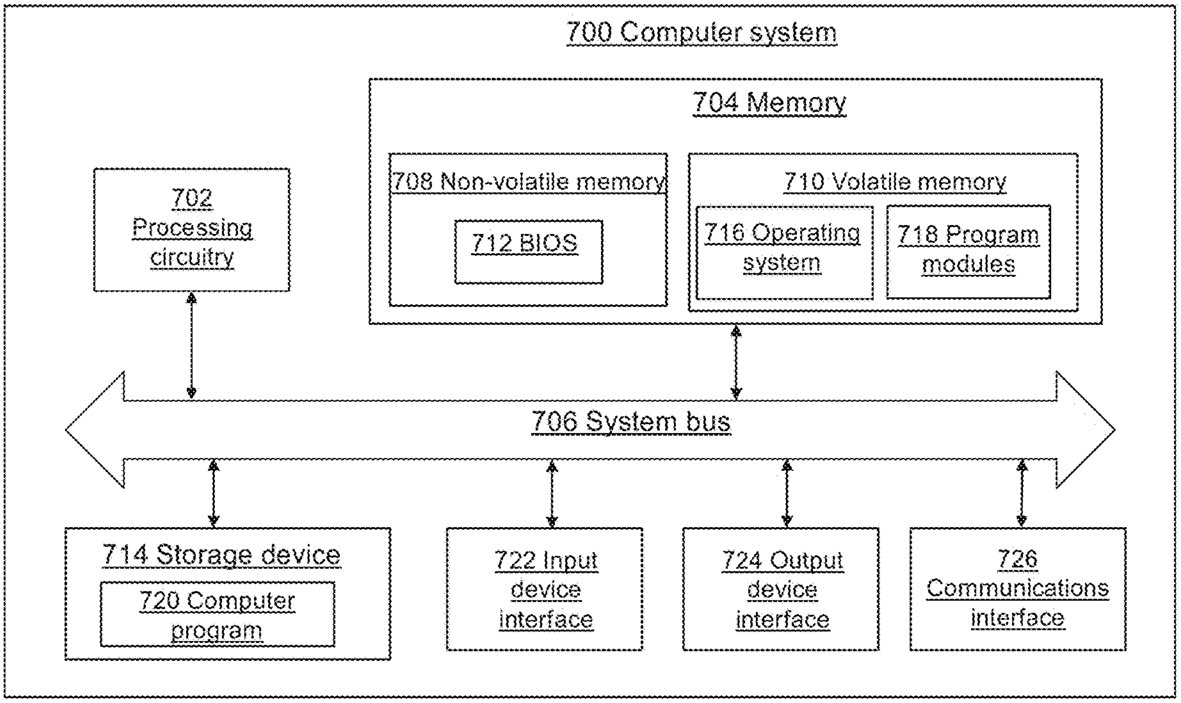
FIG. 9 is a schematic diagram of an exemplary computer system for implementing examples disclosed herein, according to an example.

FIG. 9 is a schematic diagram of a computer system 700 for implementing examples disclosed herein. The computer system 700 is adapted to execute instructions from a computer-readable medium to perform these and/or any of the functions or processing described herein. The computer system 700 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 700 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 700 may comprise at least one computing device or electronic device capable of including firmware, hardware, and/or executing software instructions to implement the functionality described herein. The computer system 700 may include processing circuitry 702 (e.g., processing circuitry including one or more processor devices or control units), a memory 704, and a system bus 706. The computer system 700 may include at least one computing device having the processing circuitry 702. The system bus 706 provides an interface for system components including, but not limited to, the memory 704 and the processing circuitry 702. The processing circuitry 702 may include any number of hardware components for conducting data or signal processing or for executing computer code stored in memory 704. The processing circuitry 702 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 702 may further include computer executable code that controls operation of the programmable device.

The system bus 706 may be any of several types of bus structures that may further interconnect to a memory bus (with or without a memory controller), a peripheral bus, and/or a local bus using any of a variety of bus architectures. The memory 704 may be one or more devices for storing data and/or computer code for completing or facilitating methods described herein. The memory 704 may include database components, object code components, script components, or other types of information structure for supporting the various activities herein.

Any distributed or local memory device may be utilized with the systems and methods of this description. The memory 704 may be communicably connected to the processing circuitry 702 (e.g., via a circuit or any other wired, wireless, or network connection) and may include computer code for executing one or more processes described herein. The memory 704 may include non-volatile memory 708 (e.g., read-only memory (ROM), erasable programmable read-only memory (EPROM), electrically erasable programmable read-only memory (EEPROM), etc.), and volatile memory 710 (e.g., random-access memory (RAM)), or any other medium which can be used to carry or store desired program code in the form of machine-executable instructions or data structures and which can be accessed by a computer or other machine with processing circuitry 702. A basic input/output system (BIOS) 712 may be stored in the non-volatile memory 708 and can include the basic routines that help to transfer information between elements within the computer system 700.

The computer system 700 may further include or be coupled to a non-transitory computer-readable storage medium such as the storage device 714, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 714 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 714 and/or in the volatile memory 710, which may include an operating system 716 and/or one or more program modules 718. All or a portion of the examples disclosed herein may be implemented as a computer program 720 stored on a transitory or non-transitory computer-usable or computer-readable storage medium (e.g., single medium or multiple media), such as the storage device 714, which includes complex programming instructions (e.g., complex computer-readable program code) to cause the processing circuitry 702 to carry out actions described herein. Thus, the computer-readable program code of the computer program 720 can comprise software instructions for implementing the functionality of the examples described herein when executed by the processing circuitry 702. In some examples, the storage device 714 may be a computer program product (e.g., readable storage medium) storing the computer program 720 thereon, where at least a portion of a computer program 720 may be loadable (e.g., into a processor) for implementing the functionality of the examples described herein when executed by the processing circuitry 702. The processing circuitry 702 may serve as a controller or control system for the computer system 700 that is to implement the functionality described herein.

The computer system 700 may include an input device interface 722 configured to receive input and selections to be communicated to the computer system 700 when executing instructions, such as from a keyboard, mouse, touch-sensitive surface, etc. Such input devices may be connected to the processing circuitry 702 through the input device interface 722 coupled to the system bus 706 but can be connected through other interfaces, such as a parallel port, an Institute of Electrical and Electronic Engineers (IEEE) 1394 serial port, a Universal Serial Bus (USB) port, an IR interface, and the like. The computer system 700 may include an output device interface 724 configured to forward output, such as to a display, a video display unit (e.g., a liquid crystal display (LCD) or a cathode ray tube (CRT)). The computer system 700 may include a communications interface 726 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Figure 10:
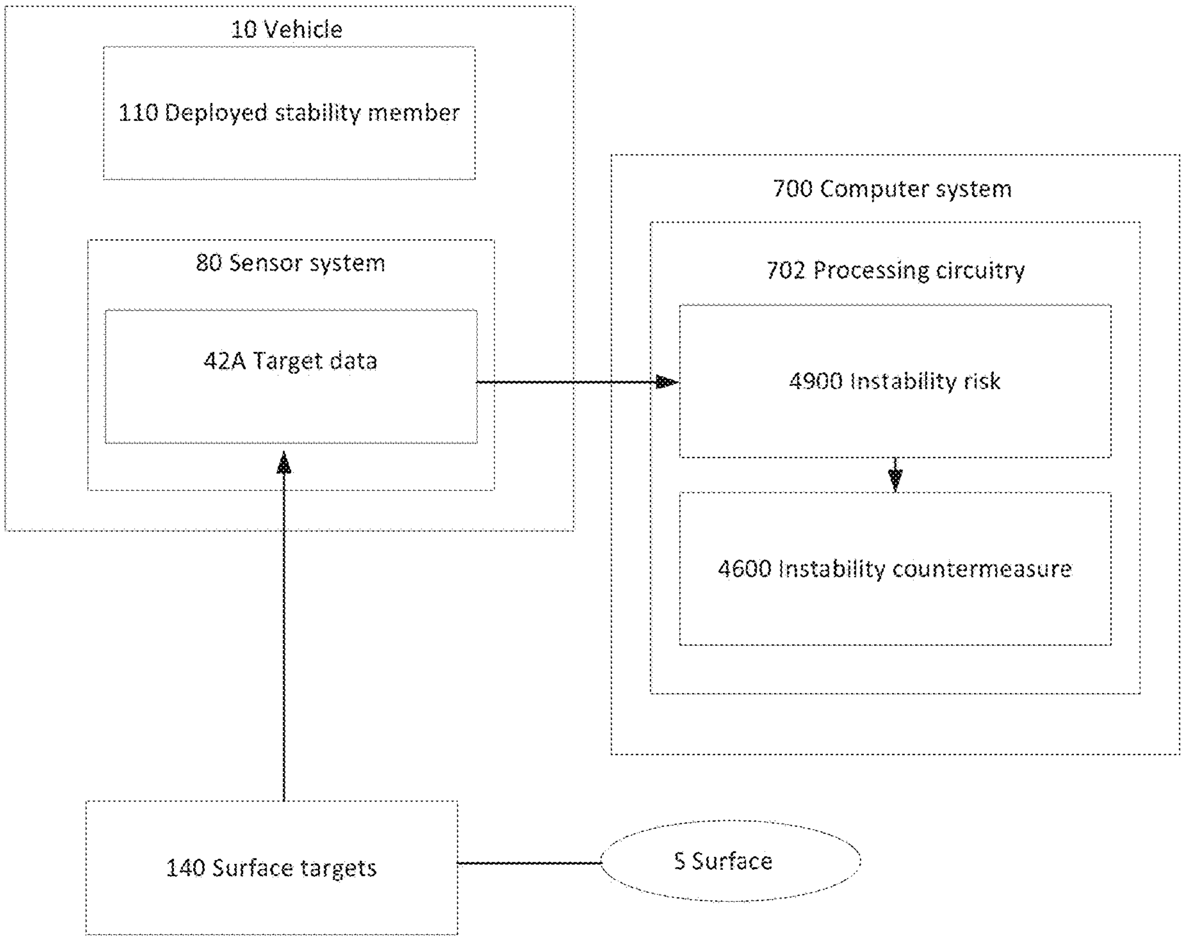
FIG. 10 is another view of FIG. 1, according to an example.

FIG. 10 is another view of FIG. 1, according to an example. The computer system 700 comprises processing circuitry 702. The processing circuitry 702 is configured to obtain, from the sensor system 80 of the vehicle 10, target data 42A. The processing circuitry 702 is configured to process the target data 42A to identify the one or more member targets 130 associated with the one or more deployed stability member 110 of the vehicle 10. The one or more deployed stability member 110 of the vehicle 10 are configured to engage the surface S, and the one or more surface targets 140 associated with the surface S.

The processing circuitry 702 is configured to identify an instability risk based on a relative movement between the member target 130 and the surface target 140 and initiate an instability countermeasure 4600 based on the instability risk 490).

Example 1: A computer system (700) comprising processing circuitry (702) configured to: obtain, (42) from a sensor system (80, 280, 380, 480) of a vehicle (10), target data (42A); process (44) the target data (42A) to identify: one or more member targets (130, 230, 430) associated with one or more deployed stability member (110, 210, 310, 410) of the vehicle (10), the one or more deployed stability member (110, 210, 310, 410) of the vehicle (10) being configured to engage a surface(S), and one or more surface targets (140, 240, 340, 440) associated with the surface(S), identify (46) an instability risk (4900) based on a relative movement between the member target (130, 230, 430) and the surface target (140, 240, 340, 440), initiate (48) an instability countermeasure (4600) based on the instability risk (4900).

Example 2: The computer system (700) of example 1, wherein the processing circuitry (702) is further configured to: identify (46) the instability risk (4900) by determining that a relative movement between the member target (130, 230, 430) and the surface target (140, 240, 340, 440) for the deployed stability member (110, 210, 310, 410) for a set time interval is outside a predefined threshold, and in response to the relative movement between said member target (130, 230, 430) and the surface target (140, 240, 340, 440) being outside said predefined threshold, determine (52) an instability countermeasure (4600) to be initiated (48).

Example 3: The computer system (700) of example 2, wherein the predefined threshold is associated with a maximum change in relative distance between the member target (130, 230, 430) and the surface target (140, 240, 340, 440) for one deployed stability member (110, 210, 310, 410).

Example 4: The computer system (700) of any of example 1-3, wherein the instability countermeasure (4600) comprises causing (4602) adjustment of the position of at least one of the one or more deployed stability members (110, 210, 310, 410) based on the target data (42A).

Example 5: The computer system (700) of example 4, wherein the instability countermeasure comprises causing adjustment of the one or more deployed stability members (110, 210, 310, 410) to push at least one of the one or more deployed stability members (110, 210, 310, 410) towards the surface(S).

Example 6: The computer system (700) of any of example 1-5, wherein the vehicle (10) further comprises a work attachment (20) operable upon deployment of the one or more deployed stability members (110, 210, 310, 410); wherein the determined instability countermeasure (4600) comprises at least one of rotating (4603) the work attachment (20), retracting (4604) the work attachment (20) and stopping (4605) movement of the work attachment (20).

Example 7: The computer system (700) of any of example 1-6, wherein the processing circuitry (702) is further configured to: determine a relative movement between a member target (230, 430) associated with a first deployed stability member (210, 310, 410) and a surface target (240, 340, 440) for the first deployed stability member (210, 310, 410) for a set time interval, determine a relative movement between a member target (230, 430) associated with a second deployed stability member (210, 310, 410) and a surface target (240, 340, 440) for the second deployed stability member (210, 310, 410) for a set time interval, and identify (46) an instability countermeasure (4600) based on said determined relative movements.

Example 8: The computer system (700) of example 7, wherein the processing circuitry (702) is configured to determine a relative angular movement between the first and second deployed stability member (210, 310, 410) based on: the determined relative movement between the member target (230, 430) associated with the first deployed stability member (210, 310, 410) and the surface target (240, 340, 440) for the first deployed stability member (210, 310, 410), and the determined relative movement between the member target (230, 430) associated with the second deployed stability member (210, 310, 410) and the surface target (240, 340, 440) for the second deployed stability member (210, 310, 410), wherein the processing circuitry (702) is further configured to identify (46) the instability countermeasure (4600) based on the determined relative angular movement.

Example 9: The computer system (700) of example 7 or 8, wherein the first deployed stability member (210, 310, 410) is arranged at a first longitudinal side of the vehicle (10) and the second deployed stability member (210, 310, 410) is arranged at a second longitudinal side of the vehicle (10) opposite to the first side.

Example 10: The computer system (700) of example 7 or 8, wherein the first deployed stability member (210, 310, 410) is arranged at a front portion the vehicle (10) and the second deployed stability member (210, 340, 410) is arranged at a rear portion of the vehicle (10) opposite to the front portion.

Example 11: The computer system (700) of any of example 1-10, wherein the member target (430) and/or the surface target (440) is provided as a graphical pattern (4301, 4401) identifiable by the sensor system (80, 280, 380, 480) and provided on the deployed stability member (410) and the surface(S), respectively.

Example 12: The computer system of any of example 1-11, wherein the surface target (240, 340, 440) is provided at the surface(S) and is associated with a reference position of engagement between the surface(S) and the deployed stability member (210, 310, 410), the vehicle (10) further comprises a work attachment (20) operable upon deployment of the one or more deployed stability members (210, 310, 410), wherein the processing circuitry (702) is further configured to: determine a relative movement between a member target (230, 430) associated with a first deployed stability member (210, 310, 410) and a surface target (240, 340, 440) for the first deployed stability member (210, 310, 410) for a set time interval, determine a relative movement between a member target (230, 430) associated with a second deployed stability member (210, 310, 410) and a surface target (240, 340, 440) for the second deployed stability member (210, 310, 410) for a set time interval, and identify (46) an instability countermeasure (4600) based on said determined relative movements by selecting an instability countermeasure (4600) from a plurality of instability countermeasures, said instability countermeasures comprising any one of causing (4602) adjustment of the position of at least one of the one or more deployed stability members (210, 310, 410) based on the target data, rotating (4603) the work attachment (20), retracting (4604) the work attachment (20), stopping (4605) movement of the work attachment (20) and issuing (4601) an alert via a user interface (384) of the vehicle (10).

Example 13: Vehicle (10) comprising a one or more deployed stability member (110, 210, 310, 410), a sensor system (80, 280, 380, 480) and the computer system (700) of any of example 1-12.

Example 14: Vehicle (10) of example 13, wherein the sensor system (80, 280, 380, 480) comprises a camera monitoring system (2800) configured to monitor the member target (130, 230, 430) and the surface target (140, 240, 340, 440) and capture image data comprising the target data.

Example 15: A computer-implemented method (1000) comprising obtaining (42), by processing circuitry (702) of a computer system (700), from a sensor system (80, 280, 380, 480) of a vehicle (10) target data (42A); processing (44) the target data (42A) to identify: one or more member targets (130, 230, 430) associated with one or more deployed stability member (110, 210, 310, 410) of the vehicle (10), the one or more deployed stability members (110, 210, 310, 410) being configured to engage a surface(S), and one or more surface targets (140, 240, 340, 440) associated with the surface(S), identifying (46) an instability risk (4900) based on relative movement between the member target (130, 230, 430) and the surface target (140, 240, 340, 440), initiating (48), by the processing circuitry (702), an instability countermeasure (4600) based on the instability risk (4900).

Example 16: The computer-implemented method (1000) of example 15, further comprising: identifying the instability risk (4900) by determining, by the processing circuitry (702), that a relative movement between the member target (130, 230, 430) and the surface target (140, 240, 340, 440) for the deployed stability member (110, 210, 310, 410) for a set time interval is outside a predefined threshold, and in response to the relative movement between said member target (130, 230, 430) and the surface target (140, 240, 340, 440) being outside said predefined threshold, determining (52), by the processing circuitry (702), an instability countermeasure (4600) to be initiated (46).

Example 17: The computer-implemented method (1000) of example 15 or 16, further comprising: determining, by the processing circuitry (702), a relative movement between a member target (230, 430) associated with a first deployed stability member (210, 310, 410) and a surface target (240, 340, 440) for the first deployed stability member (210, 310, 410) for a set time interval, determining, by the processing circuitry (702), a relative movement between a member target (230, 430) associated with a second deployed stability member (210, 310, 410) and a surface target (240, 340, 440) for the second deployed stability member (210, 310, 410) for a set time interval, and identifying (46), by the processing circuitry (702), an instability countermeasure (4600) based on said determined relative movements.

Example 18: A computer program product comprising program code for performing, when executed by the processing circuitry, the method (1000) of any of example 15-17.

Example 19: A non-transitory computer-readable storage medium comprising instructions, which when executed by the processing circuitry, cause the processing circuitry to perform the method (1000) of any of example 15-17.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to:

obtain, from a sensor system of a vehicle, target data;

process the target data to identify:

one or more member targets associated with one or more deployed stability members of the vehicle, the one or more deployed stability members of the vehicle being configured to engage a surface; and one or more surface targets associated with the surface;

determine a relative movement between a first member target associated with a first deployed stability member of the one or more deployed stability members and a first surface target for the first deployed stability member for a first set time interval;

determine a relative movement between a second member target associated with a second deployed stability member of the one or more deployed stability members and a second surface target for the second deployed stability member for a second set time interval;

determine a relative angular movement between the first and second deployed stability members based on said determined relative movements;

identify an instability risk based on the determined relative angular movement; and initiate an instability countermeasure based on the instability risk.

2. The computer system of claim 1, wherein the instability countermeasure comprises causing adjustment of a position of at least one of the one or more deployed stability members based on the target data.

3. The computer system of claim 2, wherein the instability countermeasure comprises causing adjustment of the one or more deployed stability members to push the at least one of the one or more deployed stability members towards the surface.

4. The computer system of claim 1:

wherein the vehicle further comprises a work attachment operable upon deployment of the one or more deployed stability members; and wherein the instability countermeasure comprises at least one of rotating the work attachment, retracting the work attachment and stopping movement of the work attachment.

5. The computer system of claim 1, wherein the first deployed stability member is arranged at a first longitudinal side of the vehicle and the second deployed stability member is arranged at a second longitudinal side of the vehicle opposite to the first longitudinal side.

6. The computer system of claim 1, wherein the first deployed stability member is arranged at a front portion of the vehicle and the second deployed stability member is arranged at a rear portion of the vehicle opposite to the front portion.

7. The computer system of claim 1, wherein the first member target and/or the first surface target is provided as a graphical pattern identifiable by the sensor system and provided on the one or more deployed stability members and the surface, respectively.

8. The computer system of claim 1, wherein:

a first surface target is provided at the surface and is associated with a reference position of engagement between the surface and a first deployed stability member;

the vehicle further comprises a work attachment operable upon deployment of the one or more deployed stability members;

wherein the processing circuitry is further configured to:

initiate the instability countermeasure based on the determined relative movements by at least one of:

causing adjustment of the position of at least one of the one or more deployed stability members based on the target data, rotating the work attachment, retracting the work attachment, stopping movement of the work attachment, and issuing an alert via a user interface of the vehicle.

9. A vehicle comprising the one or more deployed stability members, a sensor system, and the computer system of claim 1.

10. The vehicle of claim 9, wherein the sensor system comprises a camera monitoring system configured to monitor the first member target and the first surface target and capture image data comprising the target data.

11. A computer-implemented method comprising:

obtaining, by processing circuitry of a computer system, from a sensor system of a vehicle, target data;

processing the target data to identify:

one or more member targets associated with one or more deployed stability members of the vehicle, the one or more deployed stability members being configured to engage a surface; and one or more surface targets associated with the surface;

determining, by the processing circuitry, a relative movement between a first member target associated with a first deployed stability member and a first surface target for the first deployed stability member for a set time interval;

determining, by the processing circuitry, a relative movement between a second member target associated with a second deployed stability member and a second surface target for the second deployed stability member for a set time interval;

determining, by the processing circuitry, a relative angular movement between the first and second deployed stability members based on said determined relative movements;

identifying an instability risk based on the determined relative angular movement; and initiating, by the processing circuitry, an instability countermeasure based on the instability risk.

12. A non-transitory computer-readable storage medium comprising instructions, which when executed by the processing circuitry of claim 11, cause the processing circuitry to perform the method of claim 11.

* * * * *